United States Patent
Otsuki et al.

(10) Patent No.: US 12,344,752 B2
(45) Date of Patent: Jul. 1, 2025

(54) INK COMPOSITION, LIGHT CONVERSION LAYER, AND COLOR FILTER

(71) Applicant: DIC Corporation, Tokyo (JP)

(72) Inventors: Eiji Otsuki, Sakura (JP); Mariko Toshimitsu, Sakura (JP); Masahiro Kobayashi, Sakura (JP); Minoru Tabuchi, Sakura (JP); Takayuki Miki, Sakura (JP); Ikuro Kiyoto, Sakura (JP)

(73) Assignee: TOPPAN Holdings Inc., Tokyo (JP)

( * ) Notice: Subject to any disclaimer, the term of this patent is extended or adjusted under 35 U.S.C. 154(b) by 931 days.

(21) Appl. No.: 17/299,519

(22) PCT Filed: Dec. 23, 2019

(86) PCT No.: PCT/JP2019/050397
§ 371 (c)(1),
(2) Date: Jun. 3, 2021

(87) PCT Pub. No.: WO2020/137988
PCT Pub. Date: Jul. 2, 2020

(65) Prior Publication Data
US 2022/0056292 A1    Feb. 24, 2022

(30) Foreign Application Priority Data
Dec. 26, 2018    (JP) .................... 2018-243039

(51) Int. Cl.
*C09K 11/02* (2006.01)
*C09D 5/22* (2006.01)
(Continued)

(52) U.S. Cl.
CPC ............ *C09D 11/38* (2013.01); *C09K 11/025* (2013.01); *G02B 1/04* (2013.01); *G02B 5/223* (2013.01);
(Continued)

(58) Field of Classification Search
CPC ....... C09K 11/025; C09K 11/02; C09K 11/08; C09K 11/56; C09K 11/70; C09K 11/88;
(Continued)

(56) References Cited

U.S. PATENT DOCUMENTS

| 2017/0235191 A1* | 8/2017 | Jang ..................... G02F 1/13439 349/64 |
| 2018/0072949 A1* | 3/2018 | Satake ..................... G02B 5/20 |
| 2021/0139730 A1 | 5/2021 | Isonaka et al. |

FOREIGN PATENT DOCUMENTS

| JP | 2017-146580 A | 8/2017 |
| JP | 2017-187549 A | 10/2017 |

(Continued)

OTHER PUBLICATIONS

International Search Report dated Mar. 17, 2020, issued in counterpart International Application No. PCT/JP2019/050397 (3 pages).

*Primary Examiner* — Matthew E. Hoban
*Assistant Examiner* — Lynne Edmondson
(74) *Attorney, Agent, or Firm* — WHDA, LLP

(57) ABSTRACT

An ink composition that contains light-emitting nanocrystalline particles, a photopolymerizable component containing at least one photopolymerizable compound and having a Hansen solubility parameter $\delta p$ of 3.0 $MPa^{0.5}$ or more, and a phosphite compound with a partial structure represented by the following formula (1).

(Continued)

[In the formula (1), $X^1$ to $X^3$ independently denote an oxygen atom or a sulfur atom, $R^1$ denotes an alkyl group, and * denotes a bonding arm.]

10 Claims, 1 Drawing Sheet

(51) Int. Cl.
    *C09D 11/101*     (2014.01)
    *C09D 11/38*     (2014.01)
    *C09K 11/08*     (2006.01)
    *C09K 11/70*     (2006.01)
    *G02B 1/04*     (2006.01)
    *G02B 5/22*     (2006.01)
    *B82Y 40/00*     (2011.01)

(52) U.S. Cl.
    CPC ............... *B82Y 40/00* (2013.01); *C09D 5/22* (2013.01); *G02B 2207/101* (2013.01)

(58) Field of Classification Search
    CPC ..... C09D 11/38; C09D 11/101; C09D 11/322; C09D 11/52; C09D 11/03; C09D 5/22; G02B 5/201; G02B 5/20; G02F 1/133514
    See application file for complete search history.

(56) References Cited

FOREIGN PATENT DOCUMENTS

| | | |
|---|---|---|
| JP | 2018-109141 A | 7/2018 |
| JP | 2018-193525 A | 12/2018 |
| JP | 2019-86743 A | 6/2019 |
| JP | 2019-218422 A | 12/2019 |
| WO | 2008/001693 A1 | 1/2008 |
| WO | 2016/194351 A1 | 12/2016 |
| WO | 2018/123821 A1 | 7/2018 |

* cited by examiner

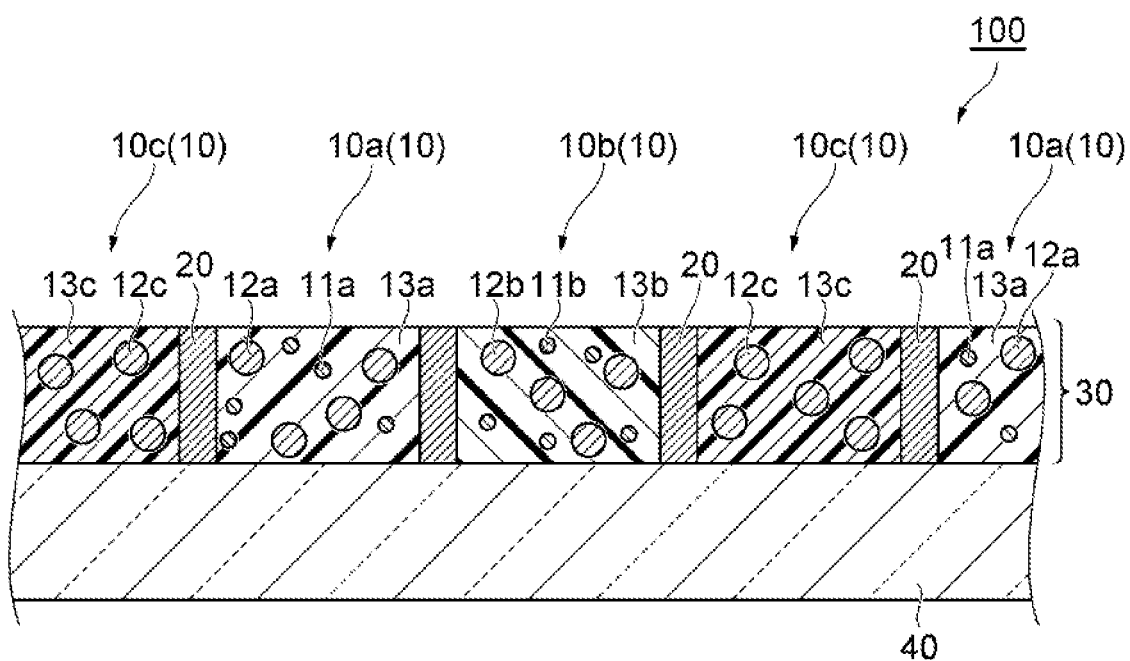

INK COMPOSITION, LIGHT CONVERSION LAYER, AND COLOR FILTER

TECHNICAL FIELD

The present invention relates to an ink composition, a light conversion layer, and a color filter.

BACKGROUND ART

Pixel units (color filter pixel units) of displays, such as liquid crystal displays, have been produced, for example, by photolithography from a curable resist material containing red organic pigment particles or green organic pigment particles and an alkali-soluble resin and/or an acrylic monomer.

With recent strong demands for displays with lower power consumption, a method for forming a pixel unit, such as red pixels or green pixels, has been actively studied, for example, using light-emitting nanocrystalline particles, such as quantum dots, quantum rods, or other inorganic fluorescent particles, instead of the red organic pigment particles or green organic pigment particles.

Due to the characteristics of such a method for producing a color filter by photolithography, however, the production method has the drawback of wasting resist materials other than pixel units including relatively expensive light-emitting nanocrystalline particles. Under such circumstances, to avoid such a waste of resist materials, the formation of a pixel unit of a light conversion substrate by an ink jet method is beginning to be studied (Patent Literature 1).

CITATION LIST

Patent Literature

PTL 1: International Publication No. WO 2008/001693

SUMMARY OF INVENTION

Technical Problem

In a known photolithography method, a low-polarity compound is sometimes used as a photopolymerizable component in an ink composition. When a color filter pixel unit is formed by the ink jet method, however, it is desirable to use a high-polarity photopolymerizable component so that an organic material constituting an ink head of a printer to be used is not eluted.

Studies by the present inventors have shown that a sufficient external quantum efficiency (EQE) may not be obtained when a color filter pixel unit is formed by the ink jet method using an ink composition containing a high-polarity photopolymerizable component.

Accordingly, it is an object of the present invention to provide an ink composition that contains a high-polarity photopolymerizable component and can form a color filter pixel unit with high external quantum efficiency by the ink jet method, and a light conversion layer and a color filter each produced by using the ink composition.

Solution to Problem

The present inventors have completed the present invention by finding that the external quantum efficiency of a color filter pixel unit can be improved by using a phosphite compound with a specific chemical structure when a high-polarity photopolymerizable component and the phosphite compound are used in combination.

One aspect of the present invention relates to an ink composition that contains light-emitting nanocrystalline particles, a photopolymerizable component containing at least one photopolymerizable compound and having a Hansen solubility parameter δp of 3.0 MPa$^{0.5}$ or more, and a phosphite compound with a partial structure represented by the following formula (1).

[Chem. 1]

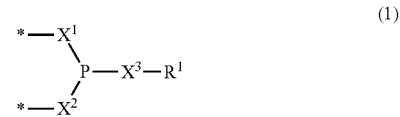

[In the formula (1), $X^1$ to $X^3$ independently denote an oxygen atom or a sulfur atom, $R^1$ denotes an alkyl group, and * denotes a bonding arm.]

The ink composition according this aspect can form a color filter pixel unit with high external quantum efficiency by the ink jet method.

The alkyl group in the formula (1) preferably has 1 to 13 carbon atoms.

The phosphite compound is preferably liquid at 25° C. and at 1 atm.

The phosphite compound preferably has two partial structures represented by the formula (1).

The phosphite compound preferably has no aromatic ring.

The phosphite compound is preferably a compound represented by the following formula (6).

[Chem. 2]

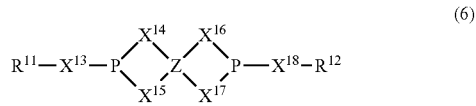

[In the formula (6), $X^{13}$ to $X^{28}$ independently denote an oxygen atom or a sulfur atom, Z denotes a tetravalent hydrocarbon group, $R^{11}$ and $R^{12}$ independently denote a monovalent hydrocarbon group, and at least one of $R^{11}$ and $R^{12}$ denotes an alkyl group.]

The ink composition can be used to form a light conversion layer. In other words, the ink composition may be an ink composition for forming a light conversion layer.

The ink composition is preferably used in an ink jet system. In other words, the ink composition is preferably an ink jet ink.

Another aspect of the present invention relates to a light conversion layer including a plurality of pixel units and a light-shielding portion between the plurality of pixel units, wherein the plurality of pixel units have a light-emitting pixel unit containing a cured product of the ink composition.

The light conversion layer may include, as the light-emitting pixel unit, a first light-emitting pixel unit containing light-emitting nanocrystalline particles that absorb light in the wavelength range of 420 to 480 nm and emit light in the emission peak wavelength range of 605 to 665 nm, and a second light-emitting pixel unit containing light-emitting nanocrystalline particles that absorb light in the wavelength range of 420 to 480 nm and emit light in the emission peak wavelength range of 500 to 560 nm.

The light conversion layer may further include a non-luminous pixel unit containing light-scattering particles.

Another aspect of the present invention relates to a color filter including the light conversion layer.

Advantageous Effects of Invention

The present invention can provide an ink composition that contains a high-polarity photopolymerizable component and can form a color filter pixel unit with high external quantum efficiency by the ink jet method, and a light conversion layer and a color filter each produced by using the ink composition.

BRIEF DESCRIPTION OF DRAWINGS

FIG. 1 is a schematic cross-sectional view of a color filter according to an embodiment of the present invention.

DESCRIPTION OF EMBODIMENTS

Embodiments of the present invention are described in detail below.
<Ink Composition>

An ink composition according to an embodiment is a light-emitting ink composition that contains light-emitting nanocrystalline particles, a photopolymerizable component containing at least one photopolymerizable compound and having a Hansen solubility parameter δp of 3.0 $\text{MPa}^{0.5}$ or more, and a phosphite compound with a partial structure represented by the following formula (1) (hereinafter also referred to simply as a "phosphite compound").

[Chem. 3]

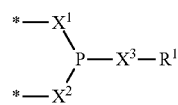

(1)

[In the formula (1), $X^1$ to $X^3$ independently denote an oxygen atom or a sulfur atom, $R^1$ denotes an alkyl group, and * denotes a bonding arm.]

The ink composition is, for example, an ink composition for forming a light conversion layer (for example, for forming a color filter pixel unit) used to form a pixel unit of a light conversion layer of a color filter or the like. The ink composition, which contains the photopolymerizable component with a Hansen solubility parameter δp of 3.0 $\text{MPa}^{0.5}$ or more, is less likely to cause the elution of an organic material used in an ink head of a printer and can be suitably used in the ink jet method. Although containing such a high-polarity photopolymerizable component, the ink composition can form a color filter pixel unit with high external quantum efficiency by the ink jet method. Although the reason for such an effect is not clear, the present inventors assume that the phosphite compound with the partial structure represented by the formula (1) exists in the ink composition in a state sufficiently compatible with the photopolymerizable component and functions easily as an antioxidant.

An ink composition according to an embodiment can be used as an ink for use in a method for producing a traditional color filter. To avoid waste of materials, such as relatively expensive light-emitting nanocrystalline particles and a solvent, and to use only a required amount of the ink composition in a required portion to form a pixel unit (a light conversion layer), preferably, the ink composition is appropriately prepared to be suitable for an ink jet system rather than for a photolithography system.

An ink composition for a color filter for use in an ink jet system (an ink jet ink for a color filter) is described below as an example of an ink composition according to an embodiment. The ink composition described below may further contain another component, such as an organic ligand or light-scattering particles, in addition to the light-emitting nanocrystalline particles, the photopolymerizable component, and the phosphite compound.

[Light-Emitting Nanocrystalline Particles]

The light-emitting nanocrystalline particles are nanoscale crystals that absorb excitation light and emit fluorescence or phosphorescence, for example, crystals that have a maximum particle size of 100 nm or less measured with a transmission electron microscope or a scanning electron microscope.

For example, the light-emitting nanocrystalline particles can absorb light with a specified wavelength and emit light with a wavelength different from the absorption wavelength (fluorescence or phosphorescence). The light-emitting nanocrystalline particles may be red-light-emitting nanocrystalline particles (red luminous nanocrystalline particles), which emit light in the emission peak wavelength range of 605 to 665 nm (red light), green-light-emitting nanocrystalline particles (green luminous nanocrystalline particles), which emit light in the emission peak wavelength range of 500 to 560 nm (green light), or blue-light-emitting nanocrystalline particles (blue luminous nanocrystalline particles), which emit light in the emission peak wavelength range of 420 to 480 nm (blue light). In the present embodiment, the ink composition preferably contains at least one type of light-emitting nanocrystalline particles selected from these light-emitting nanocrystalline particles. Light absorbed by the light-emitting nanocrystalline particles may be light in the wavelength range of 400 nm or more and less than 500 nm (in particular, light in the wavelength range of 420 to 480 nm) (blue light) or light in the wavelength range of 200 to 400 nm (ultraviolet light). The emission peak wavelength of the light-emitting nanocrystalline particles can be determined in a fluorescence spectrum or a phosphorescence spectrum measured with a spectrofluorophotometer, for example.

The red-light-emitting nanocrystalline particles preferably have an emission peak wavelength of 665 nm or less, 663 nm or less, 660 nm or less, 658 nm or less, 655 nm or less, 653 nm or less, 651 nm or less, 650 nm or less, 647 nm or less, 645 nm or less, 643 nm or less, 640 nm or less, 637 nm or less, 635 nm or less, 632 nm or less, or 630 nm or less, and preferably have an emission peak wavelength of 628 nm or more, 625 nm or more, 623 nm or more, 620 nm or more, 615 nm or more, 610 nm or more, 607 nm or more, or 605 nm or more. Any of these upper limits and lower limits may be combined. Also in the following similar description, any of each upper limit and each lower limit may be combined.

The green-light-emitting nanocrystalline particles preferably have an emission peak wavelength of 560 nm or less, 557 nm or less, 555 nm or less, 550 nm or less, 547 nm or less, 545 nm or less, 543 nm or less, 540 nm or less, 537 nm or less, 535 nm or less, 532 nm or less, or 530 nm or less, and preferably have an emission peak wavelength of 528 nm or more, 525 nm or more, 523 nm or more, 520 nm or more, 515 nm or more, 510 nm or more, 507 nm or more, 505 nm or more, 503 nm or more, or 500 nm or more.

The blue-light-emitting nanocrystalline particles preferably have an emission peak wavelength of 480 nm or less, 477 nm or less, 475 nm or less, 470 nm or less, 467 nm or less, 465 nm or less, 463 nm or less, 460 nm or less, 457 nm or less, 455 nm or less, 452 nm or less, or 450 nm or less, and preferably have an emission peak wavelength of 450 nm or more, 445 nm or more, 440 nm or more, 435 nm or more, 430 nm or more, 428 nm or more, 425 nm or more, 422 nm or more, or 420 nm or more.

The wavelength (emission color) of light emitted by light-emitting nanocrystalline particles depends on the energy gap of the light-emitting nanocrystalline particles as well as the size (for example, particle size) of the light-emitting nanocrystalline particles according to the solution of the Schrodinger wave equation of a potential well model. Thus, the constituent material and size of light-emitting nanocrystalline particles to be used can be changed to determine the emission color.

The light-emitting nanocrystalline particles may be light-emitting nanocrystalline particles containing a semiconductor material (light-emitting semiconductor nanocrystalline particles). The light-emitting semiconductor nanocrystalline particles may be quantum dots or quantum rods. Among these, quantum dots are preferred in terms of emission spectrum controllability, reduced production costs with consistent reliability, and improved mass productivity.

The light-emitting semiconductor nanocrystalline particles may be composed entirely of a core containing a first semiconductor material or may be composed of a core containing the first semiconductor material and a shell containing a second semiconductor material, which is different from the first semiconductor material, the shell covering at least part of the core. In other words, the light-emitting semiconductor nanocrystalline particles may have a structure composed entirely of a core (a core structure) or composed of a core and a shell (a core/shell structure). Alternatively, the light-emitting semiconductor nanocrystalline particles may further have a shell containing a third semiconductor material different from the first and second semiconductor materials (a second shell) in addition to the shell containing the second semiconductor material (a first shell), the second shell covering at least part of the core. In other words, the light-emitting semiconductor nanocrystalline particles may have a structure composed of the core, the first shell, and the second shell (a core/shell/shell structure). Each of the core and the shells may be formed of mixed crystals containing two or more semiconductor materials (for example, CdSe+CdS, CIS+ZnS, etc.).

The light-emitting nanocrystalline particles preferably contain, as a semiconductor material, at least one semiconductor material selected from the group consisting of group II-VI semiconductors, group III-V semiconductors, group I-III-VI semiconductors, group IV semiconductors, and group I-II-IV-VI semiconductors.

Specific examples of the semiconductor materials include CdS, CdSe, CdTe, ZnS, ZnSe, ZnTe, Zno, HgS, HgSe, HgTe, CdSeS, CdSeTe, CdSTe, ZnSeS, ZnSeTe, ZnالسTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAS, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAS, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, Sic, SiGe, $AgInSe_2$, $CuGaSe_2$, $CuInS_2$, $CuGaS_2$, $CuInSe_2$, $AgInS_2$, $AgGaSe_2$, $AgGaS_2$, C, Si, and Ge. The light-emitting semiconductor nanocrystalline particles preferably contain at least one selected from the group consisting of Cds, CdSe, CdTe, ZnS, ZnSe, ZnTe, ZnO, HgS, HgSe, HgTe, InP, InAs, InSb, GaP, GaAs, Gasb, $AgInS_2$, $AgInSe_2$, $AgInTe_2$, $AgGaS_2$, $AgGaSe_2$, $AgGaTe_2$, $CuInS_2$, $CuInSe_2$, $CuInTe_2$, $CuGaS_2$, $CuGaSe_2$, $CuGaTe_2$, Si, C, Ge, and $Cu_2ZnSnS_4$, in terms of emission spectrum controllability, reduced production costs with consistent reliability, and improved mass productivity.

Examples of red-light-emitting semiconductor nanocrystalline particles include Case nanocrystalline particles, nanocrystalline particles having a core/shell structure with a Cds shell and a CdSe inner core, nanocrystalline particles having a core/shell structure with a CdS shell and a ZnSe inner core, nanocrystalline particles of mixed crystals of CdSe and ZnS, InP nanocrystalline particles, nanocrystalline particles having a core/shell structure with a ZnS shell and an InP inner core, nanocrystalline particles having a core/shell structure with a shell formed of mixed crystals of ZnS and ZnSe and with an InP inner core, nanocrystalline particles of mixed crystals of CdSe and CdS, nanocrystalline particles of mixed crystals of ZnSe and CdS, nanocrystalline particles having a core/shell/shell structure with a ZnSe first shell, a ZnS second shell, and an InP inner core, and nanocrystalline particles having a core/shell/shell structure with a first shell formed of mixed crystals of ZnS and ZnSe, with a ZnS second shell, and with an InP inner core.

Examples of green-light-emitting semiconductor nanocrystalline particles include Case nanocrystalline particles, nanocrystalline particles of mixed crystals of CdSe and ZnS, nanocrystalline particles having a core/shell structure with a ZnS shell and an InP inner core, nanocrystalline particles having a core/shell structure with a shell formed of mixed crystals of ZnS and ZnSe and with an InP inner core, nanocrystalline particles having a core/shell/shell structure with a ZnSe first shell, a ZnS second shell, and an InP inner core, and nanocrystalline particles having a core/shell/shell structure with a first shell formed of mixed crystals of ZnS and ZnSe, with a ZnS second shell, and with an InP inner core.

Examples of blue-light-emitting semiconductor nanocrystalline particles include ZnSe nanocrystalline particles, ZnS nanocrystalline particles, nanocrystalline particles having a core/shell structure with a ZnSe shell and a ZnS inner core, CdS nanocrystalline particles, nanocrystalline particles having a core/shell structure with a ZnS shell and an InP inner core, nanocrystalline particles having a core/shell structure with a shell formed of mixed crystals of ZnS and ZnSe and with an InP inner core, nanocrystalline particles having a core/shell/shell structure with a ZnSe first shell, a ZnS second shell, and an InP inner core, and nanocrystalline particles having a core/shell/shell structure with a first shell formed of mixed crystals of ZnS and ZnSe, with a ZnS second shell, and with an InP inner core.

The color of light emitted by semiconductor nanocrystalline particles with a fixed chemical composition can be altered to red or green by changing the average particle size of the semiconductor nanocrystalline particles. Semiconductor nanocrystalline particles by themselves preferably have minimal adverse effects on human bodies. When semiconductor nanocrystalline particles containing cadmium, selenium, or the like are used as light-emitting nanocrystalline particles, semiconductor nanocrystalline particles containing minimal amounts of these elements (cadmium, selenium, etc.) are preferably used alone, or the semiconductor nanocrystalline particles are preferably used in combination with other light-emitting nanocrystalline particles to decrease the amounts of these elements.

The light-emitting nanocrystalline particles may have any shape, may have any geometrical shape, and may have any irregular shape. For example, the light-emitting nanocrystalline particles may be spherical, ellipsoidal, pyramidal, discoid, branched, netlike, or rod-shaped. The light-emitting nanocrystalline particles preferably have less directional shapes (for example, spherical, regular tetrahedral, etc.) to improve the uniformity and fluidity of the ink composition.

The light-emitting nanocrystalline particles may have an average particle size (volume-average size) of 1 nm or more, 1.5 nm or more, or 2 nm or more in terms of easy light emission at a desired wavelength and high dispersibility and storage stability. The light-emitting nanocrystalline particles may have an average particle size of 40 nm or less, 30 nm or less, or 20 nm or less in terms of easy light emission at a desired wavelength. The average particle size (volume-average size) of the light-emitting nanocrystalline particles can be measured with a transmission electron microscope or a scanning electron microscope and can be calculated as a volume-average size.

The light-emitting nanocrystalline particles preferably have an organic ligand on their surfaces in terms of dispersion stability. For example, the organic ligand may be coordinated with the surfaces of the light-emitting nanocrystalline particles. In other words, the surfaces of the light-emitting nanocrystalline particles may be passivated by the organic ligand. In an ink composition further containing a polymer dispersant described later, the light-emitting nanocrystalline particles may have the polymer dispersant on their surfaces. In the present embodiment, for example, the organic ligand may be removed from the light-emitting nanocrystalline particles having the organic ligand, and the organic ligand may be replaced with a polymer dispersant to bond the polymer dispersant to the surfaces of the light-emitting nanocrystalline particles. From the perspective of dispersion stability in an ink jet ink, however, a polymer dispersant is preferably blended with the light-emitting nanocrystalline particles still coordinated with the organic ligand.

The organic ligand is preferably a compound that has a functional group for ensuring a high affinity for a photopolymerizable compound, an organic solvent, or the like (hereinafter also referred to simply as "affinity group") and a functional group capable of binding to light-emitting nanocrystalline particles (a functional group for ensuring adsorptivity to light-emitting nanocrystalline particles). The affinity group may be a substituted or unsubstituted aliphatic hydrocarbon group. The aliphatic hydrocarbon group may be linear or may have a branched structure. The aliphatic hydrocarbon group may or may not have an unsaturated bond. The substituted aliphatic hydrocarbon may be a group in which the carbon atoms of the aliphatic hydrocarbon group are partly substituted with an oxygen atom. The substituted aliphatic hydrocarbon group may include a (poly)oxyalkylene group, for example. The "(poly)oxyalkylene group", as used herein, refers to at least one of an oxyalkylene group and a polyoxyalkylene group in which two or more alkylene groups are linked by an ether bond. Examples of the functional group capable of binding to light-emitting nanocrystalline particles include a hydroxy group, an amino group, a carboxy group, a thiol group, a phosphate group, a phosphonate group, a phosphine group, a phosphine oxide group, and an alkoxysilyl group. Examples of the organic ligand include trioctylphosphine (TOP), trioctylphosphine oxide (TOPO), oleic acid, oleylamine, octylamine, trioctylamine, hexadecylamine, octanethiol, dodecanethiol, hexylphosphonic acid (HPA), tetradecylphosphonic acid (TDPA), and octylphosphinic acid (OPA).

In one embodiment, the organic ligand may be an organic ligand represented by the following formula (1-1).

[Chem. 4]

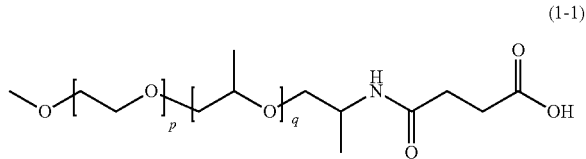

(1-1)

[In the formula (1-1), p denotes an integer in the range of 0 to 50, and q denotes an integer in the range of 0 to 50.]

In the organic ligand represented by the formula (1-1), at least one of p and q is preferably one or more, and both p and q are more preferably one or more.

The organic ligand may be an organic ligand represented by the following formula (1-2), for example.

[Chem. 5]

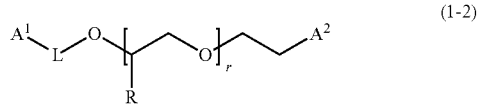

(1-2)

In the formula (1-2), $A^1$ denotes a monovalent group with a carboxy group, $A^2$ denotes a monovalent group with a hydroxy group, R denotes a hydrogen atom, a methyl group, or an ethyl group, L denotes a substituted or unsubstituted alkylene group, and r denotes an integer of 0 or more. The number of carboxy groups in the monovalent group with a carboxy group may be two or more, two or more and four or less, or two. The number of carbon atoms in the alkylene group denoted by L may range from 1 to 10, for example. In the alkylene group denoted by L, the carbon atoms may be partly substituted with a heteroatom or with at least one heteroatom selected from the group consisting of an oxygen atom, a sulfur atom, and a nitrogen atom. r may be an integer in the range of 1 to 100 or an integer in the range of 10 to 20, for example.

The organic ligand may be an organic ligand represented by the following formula (1-2A) in terms of high external quantum efficiency of the pixel unit.

[Chem. 6]

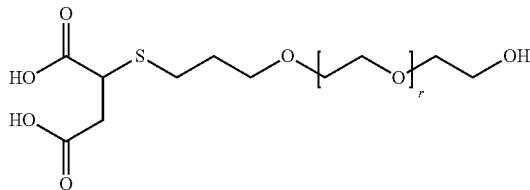

(1-2A)

In the formula (1-2A), r has the meaning described above.

The organic ligand content of the ink composition may be 15 parts or more by mass, 20 parts or more by mass, 25 parts or more by mass, 30 parts or more by mass, 35 parts or more by mass, or 40 parts or more by mass per 100 parts by mass of light-emitting nanocrystalline particles in terms of the dispersion stability of the light-emitting nanocrystalline particles and the maintenance of the light-emitting properties. The organic ligand content of the ink composition may be 50 parts or less by mass, 45 parts or less by mass, 40 parts or less by mass, or 30 parts or less by mass per 100 parts by mass of light-emitting nanocrystalline particles to easily maintain a low viscosity of the ink composition.

The light-emitting nanocrystalline particles may be dispersed in colloidal form in an organic solvent or in a photopolymerizable compound. The surfaces of the light-emitting nanocrystalline particles dispersed in an organic solvent are preferably passivated by the organic ligand. The organic solvent may be an organic solvent described later contained in the ink composition.

The light-emitting nanocrystalline particles may be a commercial product. Examples of commercial products of the light-emitting nanocrystalline particles include indium phosphide/zinc sulfide, D-dots, and CuInS/ZnS each manufactured by NN-Labs, and InP/ZnS manufactured by Aldrich.

To further improve the external quantum efficiency, the light-emitting nanocrystalline particle content is preferably 5 parts or more by mass and may be 10 parts or more by mass, 15 parts or more by mass, 20 parts or more by mass, or 30 parts or more by mass based on a total of 100 parts by mass of light-emitting nanocrystalline particles, an organic ligand, a photopolymerizable component, a phosphite compound, and light-scattering particles. To further improve the external quantum efficiency and ejection stability, the light-emitting nanocrystalline particle content is preferably 80 parts or less by mass and may be 75 parts or less by mass, 70 parts or less by mass, or 60 parts or less by mass based on a total of 100 parts by mass of light-emitting nanocrystalline particles, an organic ligand, a photopolymerizable component, a phosphite compound, and light-scattering particles.

The ink composition may contain, as light-emitting nanocrystalline particles, two or more types of red-light-emitting nanocrystalline particles, green-light-emitting nanocrystalline particles, and blue-light-emitting nanocrystalline particles and preferably contains only one type of these particles. When the ink composition contains red-light-emitting nanocrystalline particles, the green-light-emitting nanocrystalline particle content and the blue-light-emitting nanocrystalline particle content are preferably 10% or less by mass, more preferably 0% by mass, of the total mass of the light-emitting nanocrystalline particles. When the ink composition contains green-light-emitting nanocrystalline particles, the red-light-emitting nanocrystalline particle content and the blue-light-emitting nanocrystalline particle content are preferably 10% or less by mass, more preferably 0% by mass, of the total mass of the light-emitting nanocrystalline particles.

[Photopolymerizable Component]

The photopolymerizable component contains at least one photopolymerizable compound and has a Hansen solubility parameter $\delta p$ of 3.0 MPa$^{0.5}$ or more. The Hansen solubility parameters are the Hildebrand solubility parameters divided into three components $\delta d$, $\delta p$, and $\delta h$ and represented in a three-dimensional space. $\delta d$ denotes the nonpolar interaction effect, $\delta p$ denotes the dipole-dipole force effect, and $\delta h$ denotes the hydrogen bond strength effect. The Hansen solubility parameters of various compounds are described in Charles M. Hansen, "Hansen Solubility Parameters: A Users Handbook", for example. The Hansen solubility parameters of compounds not described can be estimated using computer software (Hansen Solubility Parameters in Practice (HSPiP)).

For a photopolymerizable component composed of one photopolymerizable compound (that is, for an ink composition containing only one photopolymerizable compound), the Hansen solubility parameter $\delta p$ of the photopolymerizable component is the $\delta p$ of the photopolymerizable compound. For a photopolymerizable component composed of a plurality of photopolymerizable compounds (that is, for an ink composition containing a plurality of photopolymerizable compounds), the Hansen solubility parameter $\delta p$ of the photopolymerizable component is the sum total of the $\delta p$ of each photopolymerizable compound multiplied by the mixing ratio of the corresponding photopolymerizable compound. More specifically, for a photopolymerizable component composed of n photopolymerizable compounds, the $\delta p$ of the photopolymerizable component can be expressed by the following formula, wherein $\delta p_1$ to $\delta p_n$ denote the $\delta p$s of the corresponding photopolymerizable compounds, and $C_1$ to $C_n$ denote the mixing ratios (volume ratios) of the corresponding photopolymerizable compounds in the photopolymerizable component.

$$\delta p = \delta p_1 \times C_1 + \delta p_2 \times C_2 + \ldots + \delta p_n \times C_n$$

The same applies to the Hansen solubility parameters $\delta d$ and $\delta h$ of the photopolymerizable component described later.

The Hansen solubility parameter $\delta p$ of the photopolymerizable component is preferably 3.5 MPa$^{0.5}$ or more, more preferably 4.0 MPa$^{0.5}$ or more, to widely disperse various types of light-emitting nanocrystalline particles. The Hansen solubility parameter $\delta p$ of the photopolymerizable component may be 14.0 MPa$^{0.5}$ or less, 13.0 MPa$^{0.5}$ or less, or 12.0 MPa$^{0.5}$ or less. A $\delta p$ of 14.0 MPa$^{0.5}$ or less tends to result in difficult interaction with light-emitting nanocrystalline particles and higher external quantum efficiency.

The Hansen solubility parameter $\delta d$ of the photopolymerizable component may be, but is not limited to, 12.0 MPa$^{0.5}$ or more, 13.0 MPa$^{0.5}$ or more, or 14.0 MPa$^{0.5}$ or more, and 22.0 MPa$^{0.5}$ or less, 21.0 MPa$^{0.5}$ or less, or 20.0 MPa$^{0.5}$ or less. A $\delta d$ of 12.0 MPa$^{0.5}$ or more tends to result in high compatibility with a phosphite triester and higher external quantum efficiency. A $\delta d$ of 22.0 MPa$^{0.5}$ or less tends to result in difficult interaction with light-emitting nanocrystalline particles and higher external quantum efficiency.

The Hansen solubility parameter $\delta h$ of the photopolymerizable component may be, but is not limited to, 1.0 MPa$^{0.5}$ or more, 2.0 MPa$^{0.5}$ or more, or 3.0 MPa$^{0.5}$ or more, and 15 MPa$^{0.5}$ or less, 12.0 MPa$^{0.5}$ or less, or 10 MPa$^{0.5}$ or less. A δh of 1.0 MPa$^{0.5}$ or more tends to result in wide dispersion of various types of light-emitting nanocrystalline particles. A δh of 15.0 MPa$^{0.5}$ or less tends to result in decreased viscosity and improved ejection stability.

Photopolymerizable compounds are compounds that polymerize by light irradiation (active energy radiation). Photopolymerizable compounds are typically used in combination with a photopolymerization initiator described below. For example, radical photopolymerizable compounds are used in combination with a radical photopolymerization initiator.

Photopolymerizable compounds are compounds with an ethylenically unsaturated group, for example. In the present specification, the ethylenically unsaturated group refers to a group with an ethylenically unsaturated bond (a polymerizable carbon-carbon double bond). The number of ethylenically unsaturated bonds (for example, the number of ethylenically unsaturated groups) in the compounds with an ethylenically unsaturated group ranges from 1 to 3, for example.

Examples of the compounds with an ethylenically unsaturated group include compounds with an ethylenically unsaturated group, such as a vinyl group, a vinylene group, a vinylidene group, or a (meth)acryloyl group. To further improve the external quantum efficiency, a compound with a (meth)acryloyl group is preferable, a monofunctional or polyfunctional (meth)acrylate is more preferable, and a monofunctional or bifunctional (meth)acrylate is still more preferable. The term "(meth)acryloyl group", as used herein, refers to an "acryloyl group" and its corresponding "methacryloyl group". The same is applied to the term "(meth) acrylate". The monofunctional (meth)acryte refers to a (meth)acrylate with one (meth)acryloyl group. The polyfunctional (meth)acryte refers to a (meth)acrylate with two or more (meth)acryloyl groups.

Examples of the monofunctional (meth)acrylate include methyl (meth)acrylate, ethyl (meth)acrylate, propyl (meth) acrylate, butyl (meth)acrylate, amyl (meth)acrylate, 2-ethylhexyl (meth)acrylate, 2-ethylhexyldiglycol (meth)acrylate, octyl (meth)acrylate, nonyl (meth)acrylate, dodecyl (meth)acrylate, hexadecyl (meth)acrylate, octadecyl (meth) acrylate, cyclohexyl (meth)acrylate, methoxyethyl (meth) acrylate, methoxytriethylene glycol (meth)acrylate, methoxytripropylene glycol (meth)acrylate, poly(ethylene glycol) (meth)acrylate, butoxyethyl (meth)acrylate, phenoxyethyl (meth)acrylate, phenoxydiethylene glycol (meth) acrylate, phenoxy poly(ethylene glycol) (meth)acrylate, nonylphenoxyethyl (meth)acrylate, glycidyl (meth)acrylate, dimethylaminoethyl (meth)acrylate, diethylamincethyl (meth)acrylate, ethoxyethoxyethyl (meth)acrylate, isobornyl (meth)acrylate, dicyclopentanyl (meth)acrylate, dicyclopentenyl (meth)acrylate, dicyclopentenyloxyethyl (meth)acrylate, 2-hydroxy-3-phenoxypropyl (meth)acrylate, tetrahydrofurfuryl (meth)acrylate, 2-hydroxyethyl (meth)acrylate, 2-hydroxypropyl (meth)acrylate, benzyl (meth)acrylate, phenylbenzyl (meth)acrylate, 4-hydroxybutyl (meth)acrylate, γ-butyrolactone (meth)acrylate, adamantyl (meth)acrylate, cyclic trimethylolpropane formal (meth)acrylate, succinic acid mono(2-acryloyloxyethyl), N-[2-(acryloyloxy) ethyl]phthalimide, and N-[2-(acryloyloxy)ethyl] tetrahydrophthalimide. Among these, phenoxyethyl (meth) acrylate and ethoxyethoxyethyl (meth)acrylate are preferably used.

Examples of the polyfunctional (meth)acrylate include bifunctional (meth)acrylates, such as 1,3-butylene glycol di(meth)acrylate, 1,4-butanediol di(meth)acrylate, 1,5-pentanediol di(meth)acrylate, 3-methyl-1,5-pentanediol di(meth)acrylate, 1,6-hexanediol di(meth)acrylate, neopentyl glycol di(meth)acrylate, 1,8-octanediol di(meth)acrylate, 1,9-nonanediol di(meth)acrylate, tricyclodecane dimethanol di(meth)acrylate, ethylene glycol di(meth)acrylate, poly (ethylene glycol) di(meth)acrylate, propylene glycol di(meth)acrylate, dipropylene glycol di(meth)acrylate, tripropylene glycol di(meth)acrylate, polypropylene glycol di(meth) acrylate, neopentylglycol hydroxypivalate diacrylate, a di(meth)acrylate in which two hydroxy groups of tris(2-hydroxyethyl) isocyanurate are substituted with a (meth) acryloyloxy group, a di(meth)acrylate in which two hydroxy groups of a diol produced by the addition of four moles or more of ethylene oxide or propylene oxide to one mole of neopentyl glycol are substituted with a (meth)acryloyloxy group, a di(meth)acrylate in which two hydroxy groups of a diol produced by the addition of two moles of ethylene oxide or propylene oxide to one mole of bisphenol A are substituted with a (meth)acryloyloxy group, a di(meth)acrylate in which two hydroxy groups of a triol produced by the addition of three moles or more of ethylene oxide or propylene oxide to one mole of trimethylolpropane are substituted with a (meth)acryloyloxy group, and a di(meth) acrylate in which two hydroxy groups of a diol produced by the addition of four moles or more of ethylene oxide or propylene oxide to one mole of bisphenol A are substituted with a (meth)acryloyloxy group, and trifunctional (meth) acrylates, such as glycerin tri(meth)acrylate, trimethylolethane tri(meth)acrylate, trimethylolpropane triacrylate, and triethylpropane ethylene oxide adduct triacrylate. Among these, alkylene glycol di(meth)acrylates with an alkylene group having 4 to 12 carbon atoms are preferable. For example, neopentyl glycol di(meth)acrylate, dipropylene glycol di(meth)acrylate, 1,4-butanediol di(meth)acrylate, and 1,6-hexanediol di(meth)acrylate are preferably used.

To easily form a reliable pixel unit (a cured product of an ink composition), the photopolymerizable compound and photopolymerizable component may be alkali-insoluble. The phrase "the photopolymerizable compound is alkali-insoluble", as used herein, means that the amount of the photopolymerizable compound dissolved in 1% by mass aqueous potassium hydroxide at 25° C. is 30% or less by mass of the total mass of the photopolymerizable compound. The phrase "the photopolymerizable component is alkali-insoluble", as used herein, means that the amount of the photopolymerizable component dissolved in 1% by mass aqueous potassium hydroxide at 25° C. is 30% or less by mass of the total mass of the photopolymerizable component. The amount of the photopolymerizable compound dissolved is preferably 10% or less by mass, more preferably 3% or less by mass. The amount of the photopolymerizable component dissolved is preferably 10% or less by mass, more preferably 3% or less by mass.

To further improve the external quantum efficiency of a pixel unit (a cured product of an ink composition), the photopolymerizable component content may be 5 parts or more by mass, 10 parts or more by mass, 15 parts or more by mass, 20 parts or more by mass, 25 parts or more by mass, 30 parts or more by mass, 35 parts or more by mass, 40 parts or more by mass, or 45 parts or more by mass, and 70 parts or less by mass, 60 parts or less by mass, 50 parts or less by mass, 40 parts or less by mass, 30 parts or less by mass, or 20 parts or less by mass, based on a total of 100 parts by mass of light-emitting nanocrystalline particles, an organic ligand, the photopolymerizable component, a phosphite compound, and light-scattering particles.

[Phosphite Compound]

The phosphite compound has a partial structure represented by the following formula (1).

[Chem. 7]

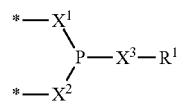
(1)

[In the formula (1), $X^1$ to $X^3$ independently denote an oxygen atom or a sulfur atom, $R^1$ denotes an alkyl group, and * denotes a bonding arm.]

The phosphite compound preferably has two or more alkyl groups. To further improve the external quantum efficiency, the phosphite compound is preferably a compound with a partial structure represented by the following formula (2), more preferably a compound represented by the following formula (3).

[Chem. 8]

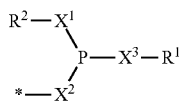
(2)

[In the formula (2), $X^1$ to $X^3$ independently denote an oxygen atom or a sulfur atom, $R^1$ and $R^2$ independently denote an alkyl group, and * denotes a bonding arm.]

[Chem. 9]

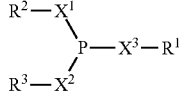
(3)

[In the formula (3), $X^1$ to $X^3$ independently denote an oxygen atom or a sulfur atom, and $R^1$ to $R^3$ independently cenote an alkyl group.]

The phosphite compound may have a plurality of partial structures represented by the formula (1). The number of partial structures represented by the formula (1) in the phosphite compound is preferably one or two. In the presence of a plurality of partial structures represented by the formula (1), $R^1$ denotes a monovalent hydrocarbon group, and it is sufficient if at least one of the plurality of $R^1$s is an alkyl group.

Examples of phosphite compounds with one partial structure represented by the formula (1) include compounds represented by the following formula (4). Examples of phosphite compounds with two partial structures represented by the formula (1) include compounds represented by the following formulae (5) and (6).

[Chem. 10]

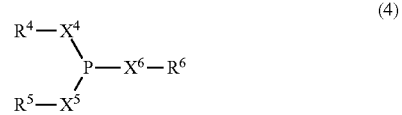
(4)

[In the formula (4), $X^4$ to $X^6$ independently denote an oxygen atom or a sulfur atom, $R^4$ to $R^6$ independently denote a monovalent hydrocarbon group, and at least one of $R^4$ to $R^6$ denotes an alkyl group.]

[Chem. 11]

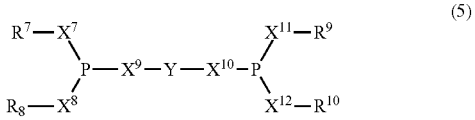
(5)

[In the formula (5), $X^7$ to $X^{12}$ independently denote an oxygen atom or a sulfur atom, Y denotes a divalent hydrocarbon group, $R^7$ to $R^{10}$ independently denote a monovalent hydrocarbon group, and at least one of $R^{11}$ to $R^{12}$ denotes an alkyl group.]

[Chem. 12]

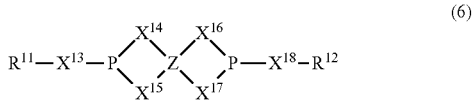
(6)

[In the formula (6), $X^{13}$ to $X^{18}$ independently denote an oxygen atom or a sulfur atom, Z denotes a tetravalent hydrocarbon group, $R^{11}$ and $R^{12}$ independently denote a monovalent hydrocarbon group, and at least one of $R^{11}$ and $R^{12}$ denotes an alkyl group.]

The alkyl groups in the formulas (1) to (6) may be linear or branched. The alkyl groups preferably have 1 to 13, more preferably 4 to 10, carbon atoms. Examples of the alkyl groups include a 2-ethylhexyl group, a butyl group, an octyl group, a nonyl group, a decyl group, an isodecyl group, a dodecyl group, and a tridecyl group.

The monovalent hydrocarbon groups (for example, the monovalent hydrocarbon groups in the formulas (4) to (6) ($R^4$ to $R^{12}$)) may be an aromatic hydrocarbon group, such as a phenyl group, a naphthyl group, a tert-butylphenyl group, a di-tert-butylphenyl group, an octylphenyl group, a nonylphenyl group, an isodecylphenyl group, an isodecylphenyl group, or an isodecylnaphthyl group, for example, but preferably have no aromatic ring. More specifically, the monovalent hydrocarbon groups ($R^4$ to $R^{12}$) are preferably aliphatic hydrocarbon groups. The monovalent hydrocarbon groups ($R^4$ to $R^{12}$) are more preferably acyclic aliphatic hydrocarbon groups, still more preferably alkyl groups, particularly preferably primary alkyl groups. In other words, all of the monovalent hydrocarbon groups ($R^4$ to $R^{12}$) in the formulae (4) to (6) are preferably primary alkyl groups. The monovalent hydrocarbon groups ($R^4$ to $R^{12}$) may have 1 to 30 or 1 to 18 carbon atoms.

The divalent hydrocarbon group (Y) in the formula (5) preferably has no aromatic ring structure. More specifically, the divalent hydrocarbon group (Y) is preferably an aliphatic hydrocarbon group. The carbon atoms of the aliphatic hydrocarbon group may be partly substituted with a heteroatom or with at least one heteroatom selected from the group consisting of an oxygen atom, a sulfur atom, and a nitrogen atom. The hydrocarbon group in the divalent hydrocarbon group (Y) has 1 to 30 carbon atoms, for example, and may have 1 to 20 or 1 to 10 carbon atoms.

The tetravalent hydrocarbon group (Z) in the formula (6) preferably has no aromatic ring structure. More specifically, the tetravalent hydrocarbon group (Z) is preferably an aliphatic hydrocarbon group. The tetravalent hydrocarbon group (Z) has 1 to 9 carbon atoms, for example.

To further improve the external quantum efficiency, the phosphite compound is preferably a compound represented by the formula (6) among these compounds.

The phosphite compound preferably has no aromatic ring. For example, when the phosphite compound is a compound represented by the formula (5), preferably, all of $R^7$ to $R^{10}$ in the formula (5) denote monovalent aliphatic hydrocarbon groups, and Y denotes a divalent aliphatic hydrocarbon group. When the phosphite compound is a compound represented by the formula (6), preferably, both $R^{11}$ and $R^{12}$ in the formula (6) are monovalent aliphatic hydrocarbon groups, and Z is a tetravalent aliphatic hydrocarbon group.

The phosphite compound is preferably liquid at 25° C. and at 1 atm in terms of higher compatibility with other components (a photopolymerizable component, etc.) in the ink jet ink and further improved external quantum efficiency. The term "liquid" means that the viscosity measured with an E-type viscometer is 100 Pa·s or less. The melting point of the phosphite compound is preferably 20° C. or less and may be 10° C. or less.

Specific examples of the phosphite compound include triethyl phosphite, tris(2-ethylhexyl) phosphite, tridecyl phosphite, trilauryl phosphite, tris(tridecyl) phosphite, trioleyl phosphite, tristearyl phosphite, diphenyl mono(2-ethylhexyl) phosphite, diphenyl monodecyl phosphite, diphenyl mono(tridecyl) phosphite, trilauryl trithiophosphite, tetra (C12-C15 alkyl)-4,4'-isopropylidenediphenyl diphosphite, 4,4'-butylidene bis(3-methyl-6-t-butylphenyl ditridecyl phosphite), bis(decyl) pentaerythritol diphosphite, bis(tridecyl) pentaerythritol diphosphite, and distearyl pentaerythritol diphosphite. Among these, in terms of a further enhanced effect of improving the external quantum efficiency, preferred are triethyl phosphite, tris(2-ethylhexyl) phosphite, tridecyl phosphite, trilauryl phosphite, tris(tridecyl) phosphite, trilauryl trithiophosphite, bis(decyl) pentaerythritol diphosphite, and bis(tridecyl) pentaerythritol diphosphite, and more preferred are bis(decyl) pentaerythritol diphosphite and bis(tridecyl) pentaerythritol diphosphite.

The ink composition may contain only one compound or a plurality of compounds as the phosphite compound.

In terms of a smaller decrease in the external quantum efficiency, the phosphite compound content may be 0.01 parts or more by mass, 0.1 parts or more by mass, 1 part or more by mass, or 5 parts or more by mass based on a total of 100 parts by mass of light-emitting nanocrystalline particles, an organic ligand, a photopolymerizable component, a phosphite compound, and light-scattering particles. In terms of a higher film strength of a coating film formed, less bleeding of the phosphite compound to the pixel unit surface, and higher external quantum efficiency, the phosphite compound content is preferably 10 parts or less by mass, more preferably 7 parts or less by mass, still more preferably 5 parts or less by mass, still more preferably 3 parts or less by mass, based on a total of 100 parts by mass of light-emitting nanocrystalline particles, an organic ligand, a photopolymerizable component, a phosphite compound, and light-scattering particles.

In terms of higher external quantum efficiency, the phosphite compound content may be 0.01 parts or more by mass, 0.1 parts or more by mass, 0.5 parts or more by mass, 1 part or more by mass, or 3 parts or more by mass per 100 parts by mass of the photopolymerizable component. In terms of a higher film strength of a coating film formed, less bleeding of the phosphite compound to the pixel unit surface, and higher external quantum efficiency, the phosphite compound content may be 10 parts or less by mass, 7 parts or less by mass, or 5 parts or less by mass per 100 parts by mass of the photopolymerizable component.

The ink composition may contain only the phosphite compound as an antioxidant and may further contain a component functioning as an antioxidant (for example, a known antioxidant, such as a phenolic antioxidant, an amine antioxidant, a phosphorus antioxidant other than the phosphite compound, or a sulfur antioxidant) in addition to the phosphite compound without losing the advantages of the present invention.

[Photopolymerization Initiator]

The ink composition may further contain a photopolymerization initiator. The photopolymerization initiator is a radical photopolymerization initiator, for example. The radical photopolymerization initiator is preferably of a molecule cleavage type or hydrogen abstraction type.

The radical photopolymerization initiator of the molecule cleavage type is preferably benzoin isobutyl ether, 2,4-diethylthioxanthone, 2-isopropylthioxanthone, 2,4,6-trimethylbenzoyldiphenylphosphine oxide, 2-benzyl-2-dimethylamino-1-(4-morpholinophenyl)-butane-1-one, bis(2,6-dimethoxybenzoyl)-2,4,4-trimethylpentylphosphine oxide, (2,4,6-trimethylbenzoyl)ethoxyphenylphosphine oxide, or the like. A radical photopolymerization initiator of the molecule cleavage type other than these may also be used, for example, 1-hydroxycyclohexyl phenyl ketone, benzoin ethyl ether, benzyl dimethyl ketal, 2-hydroxy-2-methyl-1-phenylpropane-1-one, 1-(4-isopropylphenyl)-2-hydroxy-2-methylpropane-1-one, or 2-methyl-1-(4-methylthiophenyl)-2-morpholinopropane-1-one.

The radical photopolymerization initiator of the hydrogen abstraction type may be benzophenone, 4-phenylbenzophenone, isophthalphenone, or 4-benzoyl-4'-methyl-diphenylsulfide. A radical photopolymerization initiator of the molecule cleavage type and a radical photopolymerization initiator of the hydrogen abstraction type may be used in combination.

The radical photopolymerization initiator may be a commercial product. Examples of the commercial product include acylphosphine oxide compounds, such as "Omnirad TPO-H", "Omnirad TPO-L", and "Omnirad 819" manufactured by IGM resin, oxime ester compounds, such as "Irgacure OXE01" and "Irgacure OXE02" manufactured by BASF, and alkylphenone compounds, such as "Omnirad 1173", "Omnirad 907", "Omnirad 379EG", and "Omnirad 184" manufactured by IGM resin. These may be used alone or in combination.

In terms of the curability of the ink composition, the photopolymerization initiator content may be 0.1 parts or more by mass, 0.5 parts or more by mass, 1 part or more by mass, 3 parts or more by mass, or 5 parts or more by mass per 100 parts by mass of the photopolymerizable component. In terms of the temporal stability of a pixel unit (a cured product of the ink composition), the photopolymerization initiator content may be 40 parts or less by mass, 30 parts or less by mass, 20 parts or less by mass, or 10 parts or less by mass per 100 parts by mass of the photopolymerizable component.

[Light-Scattering Particles]

The ink composition may further contain light-scattering particles. For example, the light-scattering particles are optically inactive inorganic fine particles. Light-scattering particles, if present, in the ink composition can scatter light applied to a pixel unit from a light source and impart good optical characteristics.

Examples of materials constituting the light-scattering particles include metal elements, such as tungsten, zirconium, titanium, platinum, bismuth, rhodium, palladium, silver, tin, platinum, and gold; metal oxides, such as silica, barium sulfate, talc, clay, kaolin, white alumina, titanium oxide, magnesium oxide, barium oxide, aluminum oxide, bismuth oxide, zirconium oxide, and zinc oxide; metal carbonates, such as magnesium carbonate, barium carbonate, bismuth subcarbonate, and calcium carbonate; metal hydroxides, such as aluminum hydroxide; composite oxides, such as barium zirconate, calcium zirconate, calcium titanate, barium titanate, and strontium titanate, and metal salts, such as bismuth subnitrate. In terms of high ejection stability and an enhanced effect of improving the external quantum efficiency, the light-scattering particles preferably contain at least one selected from the group consisting of titanium oxide, alumina, zirconium oxide, zinc oxide, calcium carbonate, barium sulfate, barium titanate, and silica, more preferably at least one selected from the group consisting of titanium oxide, zirconium oxide, zinc oxide, and barium titanate.

The shape of the light-scattering particles may be spherical, filamentary, or amorphous. The light-scattering particles preferably have less directional shapes (for example, spherical, regular tetrahedral, etc.) to improve the uniformity, fluidity, and light scattering of the ink composition and to improve the ejection stability.

In terms of high ejection stability and an enhanced effect of improving the external quantum efficiency, the light-scattering particles in the ink composition may have an average particle size (volume-average size) of 0.05 μm (50 nm) or more, 0.2 μm (200 nm) or more, or 0.3 μm (300 nm) or more. In terms of high ejection stability, the average particle size (volume-average size) of the light-scattering particles in the ink composition may be 1.0 μm (1000 nm) or less, 0.6 μm (600 nm) or less, or 0.4 μm (400 nm) or less. The average particle size (volume-average size) of the light-scattering particles in the ink composition may range from 0.05 to 1.0 μm, 0.05 to 0.6 μm, 0.05 to 0.4 μm, 0.2 to 1.0 μm, 0.2 to 0.6 μm, 0.2 to 0.4 μm, 0.3 to 1.0 μm, 0.3 to 0.6 μm, or 0.3 to 0.4 μm. To easily achieve such an average particle size (volume-average size), the average particle size (volume-average size) of the light-scattering particles to be used may be 0.05 μm or more or 1.0 μm or less. In the present specification, the average particle size (volume-average size) of the light-scattering particles in the ink composition can be measured with a dynamic light-scattering Nanotrac particle size distribution analyzer and can be calculated as a volume-average size. The average particle size (volume-average size) of the light-scattering particles to be used can be determined, for example, by measuring the particle size of each particle with a transmission electron microscope or a scanning electron microscope and calculating the volume-average size.

In terms of an enhanced effect of improving the external quantum efficiency, the light-scattering particle content of the ink composition may be 0.1 parts or more by mass, 1 part or more by mass, 5 parts or more by mass, 7 parts or more by mass, 10 parts or more by mass, or 12 parts or more by mass based on a total of 100 parts by mass of light-emitting nanocrystalline particles, an organic ligand, a photopolymerizable component, a phosphite compound, and light-scattering particles. In terms of high ejection stability and an enhanced effect of improving the external quantum efficiency, the light-scattering particle content may be 60 parts or less by mass, 50 parts or less by mass, 40 parts or less by mass, 30 parts or less by mass, 25 parts or less by mass, 20 parts or less by mass, or 15 parts or less by mass based on a total of 100 parts by mass of light-emitting nanocrystalline particles, an organic ligand, a photopolymerizable component, a phosphite compound, and light-scattering particles.

The mass ratio of the light-scattering particle content to the light-emitting nanocrystalline particle content (light-scattering particles/light-emitting nanocrystalline particles) may be 0.1 or more, 0.2 or more, or 0.5 or more in terms of an enhanced effect of improving the external quantum efficiency. The mass ratio (light-scattering particles/light-emitting nanocrystalline particles) may be 5.0 or less, 2.0 or less, or 1.5 or less in terms of an enhanced effect of improving the external quantum efficiency and good continuous ejectability during ink jet printing (ejection stability).

In terms of the viscosity suitable for an ink jet ink, the total amount of light-emitting nanocrystalline particles and light-scattering particles in the ink composition is preferably 30 parts or more by mass, more preferably 50 parts or more by mass, still more preferably 65 parts or more by mass, based on a total of 100 parts by mass of light-emitting nanocrystalline particles, an organic ligand, a photopolymerizable component, a phosphite compound, and light-scattering particles. In terms of the viscosity suitable for an ink jet ink, the total amount of light-emitting nanocrystalline particles and light-scattering particles in the ink composition is preferably 85 parts or less by mass, more preferably 80 parts or less by mass, still more preferably 75 parts or less by mass, based on a total of 100 parts by mass of light-emitting nanocrystalline particles, an organic ligand, a photopolymerizable component, a phosphite compound, and light-scattering particles.

[Polymer Dispersant]

The ink composition may further contain a polymer dispersant. The polymer dispersant is a polymer that has a weight-average molecular weight of 750 or more and has a functional group with an affinity for light-scattering particles. The polymer dispersant has the function of dispersing light-scattering particles. The polymer dispersant adsorbs to light-scattering particles via the functional group with an affinity for the light-scattering particles and disperses the light-scattering particles in the ink composition by electrostatic repulsion and/or steric repulsion between polymer dispersant molecules. The polymer dispersant, if present, in the ink composition can uniformly disperse light-scattering particles even at a relatively high light-scattering particle content (for example, approximately 60% by mass). The polymer dispersant is preferably bonded to and adsorbs to the surfaces of light-scattering particles, and may be bonded to and adsorb to the surfaces of light-emitting nanocrystalline particles, or may be free in the ink composition.

The functional group with an affinity for light-scattering particles may be an acidic functional group, a basic functional group, or a nonionic functional group. The acidic functional group has a dissociative proton and may be neutralized with a base, such as an amine or a hydroxide ion.

The basic functional group may be neutralized with an acid, such as an organic acid or an inorganic acid.

Examples of the acidic functional group include a carboxy group (—COOH), a sulfo group (—SO$_3$H), a sulfate group (—OSO$_3$H), a phosphonate group (—PO(OH)$_3$), a phosphate group (—OPO(OH)$_3$), a phosphinate group (—PO(OH)—), and a mercapto group (—SH).

Examples of the basic functional group include primary, secondary, and tertiary amino groups, an ammonium group, an imino group, and nitrogen-containing heterocyclic groups, such as pyridine, pyrimidine, pyrazine, imidazole, and triazole.

Examples of the nonionic functional group include a hydroxy group, an ether group, a thioether group, a sulfinyl group (—SO—), a sulfonyl group (—SO$_2$—), a carbonyl group, a formyl group, an ester group, a carbonate group, an amide group, a carbamoyl group, a ureido group, a thioamide group, a thioureido group, a sulfamoyl group, a cyano group, an alkenyl group, an alkynyl group, a phosphine oxide group, and a phosphine sulfide group.

The polymer dispersant may be a polymer of a single monomer (homopolymer) or a copolymer of multiple types of monomers (copolymer). The polymer dispersant may be a random copolymer, a block copolymer, or a graft copolymer. When the polymer dispersant is a graft copolymer, the polymer dispersant may be a comb-shaped graft copolymer or a star graft copolymer. The polymer dispersant may be an acrylic resin, a polyester resin, a polyurethane resin, a polyamide resin, a polyether, a phenolic resin, a silicone resin, a polyurea resin, an amino resin, an epoxy resin, a polyethyleneimine, a polyamine, such as polyallylamine, or a polyimide, for example.

The polymer dispersant may be a commercial product. Examples of the commercial product include Ajisper PB series manufactured by Ajinomoto Fine-Techno Co., Inc., DISPERBYK series and BYK series manufactured by BYK, and Efka series manufactured by BASF.

[Solvent]

The ink composition may further contain a solvent. Examples of the solvent include organic solvents, such as ethylene glycol monobutyl ether acetate, diethylene glycol monobutyl ether acetate, diethylene glycol monoethyl ether acetate, diethylene glycol dibutyl ether, diethyl adipate, dibutyl oxalate, dimethyl malonate, diethyl malonate, dimethyl succinate, diethyl succinate, 1,4-butanediol diacetate, and glyceryl triacetate.

In terms of the continuous ejection stability of the ink jet ink, the solvent preferably has a boiling point of 150° C. or more, more preferably 180° C. or more. To form a pixel unit, the solvent must be removed from the ink composition before the ink composition is cured. To easily remove the solvent, the solvent preferably has a boiling point of 300° C. or less.

The solvent preferably contains an acetate compound with a boiling point of 150° C. or more. This can improve the affinity between light-emitting nanocrystalline particles and the solvent and enables the light-emitting nanocrystalline particles to have good light-emitting properties. Specific examples of the acetate compound with a boiling point of 150° C. or more include monoacetate compounds, such as diethylene glycol monoethyl ether acetate, ethylene glycol monobutyl ether acetate, diethylene glycol monobutyl ether acetate, and dipropylene glycol methyl ether acetate, diacetate compounds, such as 1,4-butanediol diacetate and propylene glycol diacetate, and triacetate compounds, such as glyceryl triacetate.

In the ink composition according to the present embodiment, which contains the photopolymerizable component, light-scattering particles and light-emitting nanocrystalline particles can be dispersed in the photopolymerizable component without using a solvent. Thus, the ink composition does not necessarily contain a solvent. This can obviate the need for the process of removing the solvent by drying in the formation of a pixel unit. The solvent content is 0% or more by mass of the total mass of the ink composition and may be 60% or less by mass, 30% or less by mass, 10% or less by mass, or 1% or less by mass.

In terms of ejection stability during ink jet printing, the ink composition may have a viscosity of 2 mPa·s or more, 5 mPa·s or more, or 7 mPa·s or more at the ink temperature during ink jet printing (for example, 25° C. or 40° C.). The ink composition may have a viscosity of 20 mPa·s or less, 15 mPa·s or less, or 12 mPa·s or less at the ink temperature during ink jet printing. The ink composition may have a viscosity in the range of 2 to 20 mPa·s, 2 to 15 mPa·s, 2 to 12 mPa·s, 5 to 20 mPa·s, 5 to 15 mPa·s, 5 to 12 mPa·s, 7 to 20 mPa·s, 7 to 15 mPa·s, or 7 to 12 mPa·s at the ink temperature during ink jet printing. In the present specification, the viscosity of an ink composition is measured with an E-type viscometer, for example.

When the ink composition has a viscosity of 2 mPa·s or more at the ink temperature during ink jet printing, the ink jet ink has a stable meniscus shape at the tip of an ink ejection hole of an ejection head, which makes it easy to control the ejection (for example, the ejection amount and ejection timing) of the ink jet ink. When the ink composition has a viscosity of 20 mPa·s or less at the ink temperature during ink jet printing, the ink jet ink can be smoothly ejected from an ink ejection hole.

The surface tension of the ink composition is preferably suitable for an ink jet system and more specifically preferably ranges from 20 to 40 mN/m, more preferably 25 to 35 mN/m. A surface tension in these ranges can result in easy ejection control (for example, the control of the ejection amount and the ejection timing) and a lower occurrence of flight deviation. The term "flight deviation", as used herein, means that the landing position of an ink composition ejected from an ink ejection hole deviates by 30 μm or more from the target position. The ink composition with a surface tension of 40 mN/m or less has a stable meniscus shape at the tip of an ink ejection hole, which makes it easy to control the ejection (for example, the ejection amount and the ejection timing) of the ink composition. At a surface tension of 20 mN/m or more, it is possible to prevent the periphery of an ink ejection hole from being contaminated with the ink jet ink and reduce the occurrence of flight deviation. More specifically, there is no pixel unit insufficiently filled with an ink composition due to landing outside a pixel-unit-forming region into which the ink composition is to be landed, or there is no reduction in color reproducibility due to landing of the ink composition into a pixel-unit-forming region (or pixel unit) adjacent to a pixel-unit-forming region into which the ink composition is to be landed.

When the ink composition according to the present embodiment is used as an ink composition for an ink jet system, the ink composition is preferably used in a piezoelectric ink jet recording apparatus with a mechanical ejection mechanism including a piezoelectric device. In the piezoelectric jet system, the ink composition is not instantaneously exposed to high temperature when ejected. Thus, the light-emitting nanocrystalline particles are less likely to deteriorate, and expected light-emitting properties are more easily obtained in a pixel unit (a light conversion layer).

Although one embodiment of an ink jet ink composition is described above, the ink jet ink composition according to the embodiment can be used, for example, in the photolithography system as well as in the ink jet system. In such a case, the ink composition contains an alkali-soluble resin as a binder polymer.

When used in the photolithography system, the ink composition is first applied to a substrate and is then dried to form a coating film. The coating film thus formed is soluble in an alkaline developer and is patterned with the alkaline developer. To facilitate the disposal of waste developers, alkaline developers are mostly aqueous solutions. Thus, the coating film of the ink composition is treated with an aqueous solution. For an ink composition containing light-emitting nanocrystalline particles (quantum dots, etc.), the light-emitting nanocrystalline particles are unstable in water, and light-emitting properties (for example, fluorescence) are impaired by water. Thus, in the present embodiment, an ink jet method, which does not require treatment with an alkaline developer (aqueous solution), is preferred.

Even if the coating film of the ink composition is not treated with an alkaline developer, when the ink composition is alkali-soluble, the coating film of the ink composition easily absorbs atmospheric water, and the light-emitting properties (for example, fluorescence) of light-emitting nanocrystalline particles (quantum dots, etc.) are impaired over time. From this perspective, in the present embodiment, the coating film of the ink composition is preferably alkali-insoluble. Thus, the ink composition according to the present embodiment can preferably form an alkali-insoluble coating film. Such an ink composition can be produced by using an alkali-insoluble photopolymerizable component as a photopolymerizable component. The phrase "the coating film of the ink composition is alkali-insoluble", as used herein, means that the amount of the coating film of the ink composition dissolved in 1% by mass aqueous potassium hydroxide at 25° C. is 30% or less by mass of the total mass of the coating film of the ink composition. The amount of the coating film of the ink composition dissolved is preferably 10% or less by mass, more preferably 3% or less by mass. The fact that an ink composition can form an alkali-insoluble coating film can be confirmed by applying the ink composition to a substrate, drying the ink composition at 80° C. for 3 minutes, and measuring the amount of the resulting coating film 1 μm in thickness dissolved as described above.

<Method for Producing Ink Composition>

For example, the ink composition according to the embodiment is produced by mixing and dispersing the components of the ink composition. A method for producing an ink composition containing light-scattering particles and a polymer dispersant is described below as an example.

For example, the method for producing an ink composition includes a first step of preparing a light-scattering particle dispersion containing light-scattering particles and a polymer dispersant and a second step of mixing the light-scattering particle dispersion and light-emitting nanocrystalline particles. In this method, the light-scattering particle dispersion may further contain a photopolymerizable compound, which may be further mixed in the second step. The light-scattering particle dispersion may further contain a phosphite compound, which may be further mixed in the second step. The light-scattering particles can be sufficiently dispersed by this method. This can improve the optical characteristics (for example, external quantum efficiency) of a pixel unit and can easily produce a light-emitting ink composition with high ejection stability.

In the step of preparing the light-scattering particle dispersion, the light-scattering particles, the polymer dispersant, and the optional photopolymerizable compound and/or phosphite compound may be mixed and dispersed to prepare the light-scattering particle dispersion. The mixing and dispersion may be performed with a dispersing apparatus, such as a bead mill, a paint conditioner, a planetary mixer, or a jet mill. To improve the dispersibility of light-scattering particles and to easily adjust the average particle size of light-scattering particles in a desired range, a bead mill or a paint conditioner is preferably used. Mixing the light-scattering particles with the polymer dispersant before mixing the light-emitting nanocrystalline particles with the light-scattering particles can more sufficiently disperse the light-scattering particles. This can more easily achieve high ejection stability and external quantum efficiency.

The method for producing an ink composition may further include the step of preparing a light-emitting nanocrystalline particle dispersion containing the light-emitting nanocrystalline particles, the photopolymerizable compound, and the optional phosphite compound before the second step. In such a case, in the second step, the light-scattering particle dispersion and the light-emitting nanocrystalline particle dispersion are mixed. In the step of preparing a light-emitting nanocrystalline particle dispersion, light-emitting nanocrystalline particles, the photopolymerizable compound, and the optional phosphite compound may be mixed and dispersed to prepare the light-emitting nanocrystalline particle dispersion. The light-emitting nanocrystalline particles may have an organic ligand on their surfaces. Thus, the light-emitting nanocrystalline particle dispersion may further contain the organic ligand. The mixing and dispersion may be performed with a dispersing apparatus, such as a bead mill, a paint conditioner, a planetary mixer, or a jet mill. To improve the dispersibility of light-emitting nanocrystalline particles and to easily adjust the average particle size of light-emitting nanocrystalline particles in a desired range, a bead mill, a paint conditioner, or a jet mill is preferably used. The light-emitting nanocrystalline particles can be sufficiently dispersed by this method. This can improve the optical characteristics (for example, external quantum efficiency) of a pixel unit and can easily produce an ink composition with high ejection stability.

In this production method, a component (solvent, etc.) other than the above components may be further used. In this case, the other component may be contained in the light-emitting nanocrystalline particle dispersion or the light-scattering particle dispersion. Alternatively, the other component may be contained in a composition produced by mixing the light-emitting nanocrystalline particle dispersion with the light-scattering particle dispersion.

<Ink Composition Set>

An ink composition set according to an embodiment contains the ink composition according to the embodiment. In addition to the ink composition (light-emitting ink composition) according to the embodiment, the ink composition set may have an ink composition containing no light-emitting nanocrystalline particles (a non-luminous ink composition). The non-luminous ink composition may be a known ink composition and may have a composition similar to that of the ink composition (light-emitting ink composition) according to the embodiment except that the non-luminous ink composition contains no light-emitting nanocrystalline particles.

The non-luminous ink composition contains no light-emitting nanocrystalline particles, and therefore light emitted from a pixel unit formed of the non-luminous ink composition (a pixel unit containing a cured product of the non-luminous ink composition) has almost the same wavelength as incident light. Thus, the non-luminous ink composition is suitably used to form a pixel unit of the same color as light from a light source. For example, for light from a light source in the wavelength range of 420 to 480 nm (blue light), a pixel unit formed of the non-luminous ink composition can be a blue pixel unit.

The non-luminous ink composition preferably contains light-scattering particles. A pixel unit formed of the non-luminous ink composition containing light-scattering particles can scatter light incident on the pixel unit. This can reduce the difference in light intensity of light emitted from the pixel unit at a viewing angle.

<Light Conversion Layer and Color Filter>

A light conversion layer and a color filter produced by using the ink composition set according to the above embodiment are described in detail below with reference to the accompanying drawing. In the following description, the same or equivalent elements are denoted by the same reference numerals and letters and are not repeatedly described.

FIG. 1 is a schematic cross-sectional view of a color filter according to an embodiment. As illustrated in FIG. 1, a color filter 100 includes a substrate 40 and a light conversion layer 30 located on the substrate 40. The light conversion layer 30 includes a plurality of pixel units 10 and a light-shielding portion 20.

The light conversion layer 30 includes, as the pixel units 10, a first pixel unit 10a, a second pixel unit 10b, and a third pixel unit 10c. The first pixel unit 10a, the second pixel unit 10b, and the third pixel unit 10c are repetitively arranged in a grid-like pattern in this order. The light-shielding portion 20 is located between adjacent pixel units, that is, between the first pixel unit 10a and the second pixel unit 10b, between the second pixel unit 10b and the third pixel unit 10c, and between the third pixel unit 10c and the first pixel unit 10a. In other words, these adjacent pixel units are separated by the light-shielding portion 20.

Each of the first pixel unit 10a and the second pixel unit 10b is a light-emitting pixel unit (luminous pixel unit) containing a cured product of the ink composition according to the above embodiment. The cured product illustrated in FIG. 1 contains light-emitting nanocrystalline particles, a cured component, and light-scattering particles. The cured component is a component produced by polymerization of a photopolymerizable component and contains a polymer of the photopolymerizable component and a phosphite compound. The first pixel unit 10a includes a first cured component 13a as well as first light-emitting nanocrystalline particles 11a and first light-scattering particles 12a each dispersed in the first cured component 13a. Likewise, the second pixel unit 10b includes a second cured component 13b as well as second light-emitting nanocrystalline particles 11b and second light-scattering particles 12b each dispersed in the second cured component 13b. In the first pixel unit 10a and the second pixel unit 10b, the first cured component 13a may be the same as or different from the second cured component 13b, and the first light-scattering particles 12a may be the same as or different from the second light-scattering particles 12b. The cured component may contain organic components (an organic ligand, a polymer dispersant, an unreacted photopolymerizable component, etc.) contained in the ink composition in addition to the polymer and the phosphite compound of the photopolymerizable component.

The first light-emitting nanocrystalline particles 11a are red-light-emitting nanocrystalline particles that absorb light in the wavelength range of 420 to 480 nm and emit light in the emission peak wavelength range of 605 to 665 nm. Thus, the first pixel unit 10a may also be referred to as a red pixel unit that converts blue light to red light. The second light-emitting nanocrystalline particles 11b are green-light-emitting nanocrystalline particles that absorb light in the wavelength range of 420 to 480 nm and emit light in the emission peak wavelength range of 500 to 560 nm. Thus, the second pixel unit 10b may also be referred to as a green pixel unit that converts blue light to green light.

In terms of an enhanced effect of improving the external quantum efficiency and high emission intensity, the light-emitting nanocrystalline particle content of the light-emitting pixel unit is preferably 5% or more by mass of the total mass of the cured product of the light-emitting ink composition. From the same perspective, the light-emitting nanocrystalline particle content may be 10% or more by mass, 15% or more by mass, or 20% or more by mass of the total mass of the cured product of the light-emitting ink composition. In terms of high reliability of the pixel unit and high emission intensity, the light-emitting nanocrystalline particle content is preferably 80% or less by mass of the total mass of the cured product of the light-emitting ink composition. From the same perspective, the light-emitting nanocrystalline particle content may be 75% or less by mass, 70% or less by mass, or 60% or less by mass of the total mass of the cured product of the light-emitting ink composition.

In terms of an enhanced effect of improving the external quantum efficiency, the light-scattering particle content of the light-emitting pixel unit may be 0.1% or more by mass, 1% or more by mass, 3% or more by mass, or 5% or more by mass of the total mass of the cured product of the light-emitting ink composition. In terms of an enhanced effect of improving the external quantum efficiency and high reliability of the pixel unit, the light-scattering particle content may be 60% or less by mass, 50% or less by mass, 40% or less by mass, or 30% or less by mass of the total mass of the cured product of the ink composition.

The third pixel unit 10c is a non-light-emitting pixel unit (non-luminous pixel unit) containing a cured product of the non-luminous ink composition. The cured product contains no light-emitting nanocrystalline particles and contains light-scattering particles and a cured component. The cured component is, for example, a component produced by polymerization of the photopolymerizable component and contains a polymer of the photopolymerizable component. Thus, the third pixel unit 10c contains a third cured component 13c and third light-scattering particles 12c dispersed in the third cured component 13c. The third light-scattering particles 12c may be the same as or different from the first light-scattering particles 12a and the second light-scattering particles 12b.

For example, the third pixel unit 10c has a light transmittance of 30% or more in the wavelength range of 420 to 480 nm. Thus, the third pixel unit 10c functions as a blue pixel unit when a light source is used to emit light in the wavelength range of 420 to 480 nm. The transmittance in the third pixel unit 10c can be measured with a microspectrometer.

To further reduce the difference in light intensity at a viewing angle, the light-scattering particle content of the non-luminous pixel unit may be 1% or more by mass, 5% or more by mass, or 10% or more by mass of the total mass of the cured product of the non-luminous ink composition. To further reduce light reflection, the light-scattering particle content may be 80% or less by mass, 75% or less by mass, or 70% or less by mass of the total mass of the cured product of the non-luminous ink composition.

The pixel units (the first pixel unit 10a, the second pixel unit 10b, and the third pixel unit 10c) may have a thickness of 1 μm or more, 2 μm or more, or 3 μm or more, for example. The pixel units (the first pixel unit 10a, the second pixel unit 10b, and the third pixel unit 10c) may have a thickness of 30 μm or less, 20 μm or less, or 15 μm or less, for example.

The light-shielding portion 20 is a black matrix that is formed to separate adjacent pixel units and prevent color mixing and to prevent light leakage from a light source. The material of the light-shielding portion 20 may be, but is not limited to, a metal, such as chromium, or a cured product of a resin composition containing light-shielding particles, such as carbon fine particles, metal oxide, an inorganic pigment, or an organic pigment, in a binder polymer. The binder polymer may be a mixture of one or two or more resins, such as polyimide resins, acrylic resins, epoxy resins, polyacrylamides, poly(vinyl alcohol), gelatin, casein, and cellulose, may be a photosensitive resin, or may be an O/W emulsion-type resin composition (for example, emulsified reactive silicone). For example, the light-shielding portion 20 may have a thickness of 0.5 μm or more and may have a thickness of 10 μm or less.

The substrate 40 is a light-transmitting transparent substrate, for example, a transparent glass substrate, such as a quartz glass sheet, a Pyrex (registered trademark) glass sheet, or a synthetic quartz sheet, or a transparent flexible substrate, such as a transparent resin film or an optical resin film. Among these, preferred is a glass substrate formed of non-alkali glass containing no alkaline component in the glass. More specifically, preferred are "7059 glass", "1737 glass", "Eagle 200", and "Eagle XG" manufactured by Corning Inc., "AN100" manufactured by Asahi Glass Co., Ltd., and "OA-10G" and "OA-11" manufactured by Nippon Electric Glass Co., Ltd. These are materials with a low thermal expansion coefficient and have high dimensional stability and high workability in high-temperature heat treatment.

The color filter 100 including the light conversion layer 30 is suitably used when a light source is used to emit light in the wavelength range of 420 to 480 nm.

For example, the color filter 100 can be produced by forming a pattern of the light-shielding portion 20 on the substrate 40, selectively applying the ink composition (ink jet ink) according to the embodiment by an ink jet system to a pixel-unit-forming region divided by the light-shielding portion 20 on the substrate 40, and curing the ink composition by active energy beam (for example, ultraviolet light) irradiation.

A method for forming the light-shielding portion 20 may be a method for forming a thin metal film, such as chromium, or a thin film of a resin composition containing light-shielding particles in a boundary region between a plurality of pixel units on a surface of the substrate 40, and patterning the thin film. For example, the thin metal film can be formed by sputtering or vacuum evaporation, and the thin film of a resin composition containing light-shielding particles can be formed by coating or printing. The patterning may be performed by photolithography.

The ink jet system may be a Bubble Jet (registered trademark) system using an electrothermal transducer as an energy-generating device or a piezoelectric ink jet method using a piezoelectric device.

The ink composition may be cured with a mercury lamp, a metal halide lamp, a xenon lamp, or a LED, for example. For example, the irradiation light may have a wavelength of 200 nm or more and may have a wavelength of 440 nm or less. For example, the light exposure may be 10 mJ/cm$^2$ or more and may be 4000 mJ/cm$^2$ or less.

The drying temperature at which an organic solvent is volatilized may be 50° C. or more and may be 150° C. or less. The drying time may be 3 minutes or more and may be 30 minutes or less.

Although the embodiments of color filters and light conversion layers and methods for producing these are described above, the present invention is not limited to these embodiments.

For example, the light conversion layer may include a pixel unit (a blue pixel unit) containing a cured product of a light-emitting ink composition containing blue-light-emitting nanocrystalline particles instead of the third pixel unit 10c or in addition to the third pixel unit 10c. The light conversion layer may include a pixel unit (for example, a yellow pixel unit) containing a cured product of a light-emitting ink composition containing nanocrystalline particles that emit color light other than red, green, or blue. In these cases, the light-emitting nanocrystalline particles in each pixel unit of the light conversion layer preferably have an absorption maximum wavelength in the same wavelength region.

At least part of the pixel units in the light conversion layer may contain a cured product of a composition containing a pigment other than the light-emitting nanocrystalline particles.

A color filter may include an ink-repellent layer formed of an ink-repellent material, which is narrower than the light-shielding portion, on the pattern of the light-shielding portion. Instead of the ink-repellent layer, a photocatalyst-containing layer serving as a wettability variable layer may be formed in the solid pattern in a region including the pixel-unit-forming region, and then the photocatalyst-containing layer may be irradiated with light through a photomask to selectively increase the affinity of the pixel-unit-forming region to ink. The photocatalyst may be titanium oxide or zinc oxide.

The color filter may include an ink-receiving layer containing hydroxypropylcellulose, poly(vinyl alcohol), or gelatin between a substrate and a pixel unit.

The color filter may include a protective layer on a pixel unit. The protective layer is formed to flatten the color filter and to prevent the elution of components contained in the pixel unit or the elution of components contained in the pixel unit and components contained in a photocatalyst-containing layer to a liquid crystal layer. Materials of the protective layer may be those used in protective layers for known color filters.

In the production of a color filter and a light conversion layer, a pixel unit may be formed by the photolithography system instead of the ink jet system. In such a case, first, an ink composition is applied in a layer to a substrate to form an ink composition layer. The ink composition layer is then exposed to patterned light and is then developed with a developer. In this manner, a pixel unit formed of a cured product of the ink composition is formed. The developer is typically alkaline, and therefore an alkali-soluble material is used as a material of the ink composition. In terms of the efficiency in the use of materials, the ink jet system is superior to the photolithography system. This is because approximately two-thirds or more of the materials are theoretically removed as wastes in the photolithography system.

Thus, in the present embodiment, a pixel unit is preferably formed by an ink jet system using an ink jet ink.

In addition to the above light-emitting nanocrystalline particles, the pixel unit in the light conversion layer in the present embodiment may further contain a pigment of almost the same color as the emission color of the light-emitting nanocrystalline particles. To introduce a pigment into the pixel unit, the ink composition may contain the pigment.

One or two light-emitting pixel units of the red pixel unit (R), the green pixel unit (G), and the blue pixel unit (B) in the light conversion layer of the present embodiment may be used as a pixel unit or pixel units that do not contain light-emitting nanocrystalline particles but contain a coloring material. The coloring material to be used may be a known coloring material, for example, a diketopyrrolopyrrole pigment and/or an anionic red organic dye for use in the red pixel unit (R). A coloring material for the green pixel unit (G) may be at least one selected from the group consisting of halogenated copper phthalocyanine pigments, phthalocyanine green dyes, and mixtures of phthalocyanine blue dyes and azo yellow organic dyes. A coloring material for the blue pixel unit (B) may be an s copper phthalocyanine pigment and/or a cationic blue organic dye. To prevent a decrease in transmittance, the amount of each coloring material to be used in the light conversion layer preferably ranges from 1% to 5% by mass of the total mass of the pixel unit (a cured product of the ink composition).

EXAMPLES

The present invention is further described in the following examples. However, the present invention is not limited to these examples. For all the materials used in the examples, argon gas was introduced to replace dissolved oxygen with the argon gas. Titanium oxide before mixing was heated under a reduced pressure of 1 mmHg for 4 hours at 175° C. and was left to cool in an argon gas atmosphere. The liquid materials used in the examples before mixing were dehydrated with a molecular sieve 3A for 48 hours or more.

<Preparation of Photopolymerizable Component>

The following photopolymerizable components were prepared.

Photopolymerizable component 1: HDDA (1,6-hexanediol diacrylate, manufactured by Shin-Nakamura Chemical Co., Ltd., trade name: NK ester A-HD-N), $\delta p=4.6$ MPa$^{0.5}$, $\delta h=6.1$ MPa$^{0.5}$, $\delta d=16.4$ MPa$^{0.5}$ Photopolymerizable component 2: BDDAc (1,4-butanediol diacrylate, manufactured by Hitachi Chemical Co., Ltd., trade name: FA-124AS), $\delta p=9.1$ MPa$^{0.5}$, $\delta h=4.2$ MPa$^{0.5}$, $\delta d=16.8$ MPa$^{0.5}$ Photopolymerizable component 3: PHE (phenoxyethyl acrylate, manufactured by Kyoeisha Chemical Co., Ltd., trade name: Light Acrylate PO-A), $\delta p=5.4$ MPa$^{0.5}$, $\delta h=6.4$ MPa$^{0.5}$, $\delta d=17.9$ MPa$^{0.5}$ Photopolymerizable component 4: EOEA (ethoxyethoxyethyl acrylate, manufactured by MIWON, trade name: MIRAMER M170), $\delta p=5.4$ MPa$^{0.5}$, $\delta h=6.6$ MPa$^{0.5}$, $\delta d=16.1$ MPa$^{0.5}$ Photopolymerizable component 5: DPGDA (dipropylene glycol diacrylate, manufactured by MIWON, trade name: MIRAMER: M222), $\delta p=4.8$ MPa$^{0.5}$, $\delta h=6.4$ MPa$^{0.5}$, $\delta d=16.4$ MPa$^{0.5}$ Photopolymerizable component 6: HDDMA (1,6-hexanediol dimethacrylate, manufactured by Shin-Nakamura Chemical Co., Ltd., trade name: NK ester HD-N), $\delta p=4.6$ MPa$^{0.5}$, $\delta h=6.1$ MPa$^{0.5}$, $\delta d=16.4$ MPa$^{0.5}$ Photopolymerizable component 7: a mixture of NDA (1,9-nonanediol diacrylate, manufactured by Shin-Nakamura Chemical Co., Ltd., trade name: NK ester A-NOD-N) and BDDAc (mixing ratio=1:1), $\delta p=6.5$ MPa$^{0.5}$, $\delta h=4.7$ MPa$^{0.5}$, $\delta d=16.6$ MPa$^{0.5}$ <Preparation of Phosphite Compound>

A phosphite compound shown below in Table 1 was prepared.

TABLE 1

| Abbreviation | Details | Source of supply |
|---|---|---|
| JP-333E | P$(\!\!-\!\!$O$-\!\!$C$_{13}$H$_{27})_3$ <br> Tris(tridecyl) phosphite | Johoku Chemical Co., Ltd. |
| JPS-312 | P$(\!\!-\!\!$S$-\!\!$C$_{12}$H$_{25})_3$ <br> Trilauryl trithiophosphite | Johoku Chemical Co., Ltd. |
| JPM-308 | 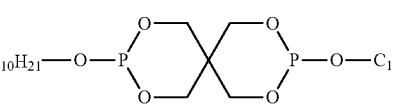 <br> Diphenyl mono(2-ethylhexyl) phosphite | Johoku Chemical Co., Ltd. |
| JPE-10 | Bis(decyl)pentaerythritol diphosphite | Johoku Chemical Co., Ltd. |

TABLE 1-continued

| Abbreviation | Details | Source of supply |
| --- | --- | --- |
| Irgafos 168 | 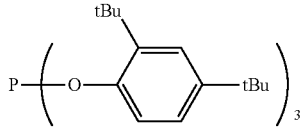<br>Tris(2,4-di-tert-butylphenyl) phosphite | BASF Japan Ltd. |

<Preparation of Red-Light-Emitting InP/ZnSeS/ZnS Nanocrystal Particle Dispersion>

[Preparation of Indium Laurate Solution]

10 g of 1-octadecene (ODE), 146 mg (0.5 mmol) of indium acetate, and 300 mg (1.5 mmol) of lauric acid were put into a reaction flask to prepare a mixture. The mixture was heated under vacuum at 140° C. for 2 hours to prepare a clear solution (an indium laurate solution). The solution was stored in a glove box at room temperature until its use. Indium laurate is less soluble at room temperature and precipitates easily. Thus, when used, a required amount of the indium laurate solution was weighed to prepare a clear solution after the indium laurate precipitate in the solution (the ODE mixture) was heated to approximately 90° C.

[Preparation of Core (InP Core) of Red-Light-Emitting Nanocrystal Particles]

A mixture of 5 g of trioctylphosphine oxide (TOPO), 1.46 g (5 mmol) of indium acetate, and 3.16 g (15.8 mmol) of lauric acid was prepared in a reaction flask. The mixture was heated in a nitrogen ($N_2$) environment at 160° C. for 40 minutes and was heated under vacuum at 250° C. for 20 minutes. The reaction temperature (the temperature of the mixture) was then increased to 300° C. in a nitrogen ($N_2$) environment. At this temperature, a mixture of 3 g of 1-octadecene (ODE) and 0.25 g (1 mmol) of tris(trimethylsilyl)phosphine was rapidly put into the reaction flask, and the reaction temperature was kept at 260° C. After five minutes, the heater was removed to stop the reaction, and the reaction solution was cooled to room temperature. 8 ml of toluene and 20 ml of ethanol were then added to the reaction solution in a glove box. After InP nanocrystalline particles were precipitated by centrifugation, the supernatant was decanted to collect the InP nanocrystalline particles. The InP nanocrystalline particles were then dispersed in hexane. Thus, a dispersion liquid (hexane dispersion liquid) containing 5% by mass InP nanocrystalline particles was prepared.

The hexane dispersion liquid of the InP nanocrystalline particles and the indium laurate solution were poured into a reaction flask to prepare a mixture. The amounts of the hexane dispersion liquid of the InP nanocrystalline particles and the indium laurate solution were adjusted to be 0.5 g (InP nanocrystalline particles: 25 mg) and 5 g (indium laurate: 178 mg), respectively. The mixture was left standing under vacuum at room temperature for 10 minutes. The flask was then filled with nitrogen gas at normal pressure. The mixture was heated to 230° C. and was held at the temperature for 2 hours to remove hexane from the flask. The internal temperature of the flask was then increased to 250° C. A mixture of 3 g of 1-octadecene (ODE) and 0.03 g (0.125 mmol) of tris(trimethylsilyl)phosphine was rapidly introduced into the reaction flask. The reaction temperature was held at 230° C. After five minutes, the heater was removed to stop the reaction, and the reaction solution was cooled to room temperature. 8 ml of toluene and 20 ml of ethanol were then added to the reaction solution in a glove box. InP nanocrystalline particles (InP cores) serving as cores of red-light-emitting InP/ZnSeS/ZnS nanocrystalline particles were then precipitated by centrifugation. The supernatant was decanted to collect the InP nanocrystalline particles (InP cores). The InP nanocrystalline particles (InP cores) were then dispersed in hexane to prepare a dispersion liquid (a hexane dispersion liquid) containing 5% by mass InP nanocrystalline particles (InP cores).

[Formation of Shells (ZnSeS/ZnS Shells) of Red-Light-Emitting Nanocrystal Particles]

2.5 g of the hexane dispersion liquid of the InP nanocrystalline particles (InP cores) was poured into a reaction flask. 0.7 g of oleic acid was put into the reaction flask at room temperature. The temperature was increased to 80° C. and was held for 2 hours. 14 mg of diethylzinc, 8 mg of bis(trimethylsilyl)selenide, and 7 mg of hexamethyldisilathiane dissolved in 1 ml ODE (a ZnSeS precursor solution) were then added dropwise to the reaction mixture, were heated to 200° C., and were held for 10 minutes to form a ZnSeS shell with a thickness of 0.5 monolayers.

The temperature was then increased to 140° C. and was held for 30 minutes. A ZnS precursor solution of 69 mg of diethylzinc and 66 mg of hexamethyldisilathiane dissolved in 2 ml of ODE was then added dropwise to the reaction mixture. The temperature was increased to 200° C. and was held for 30 minutes to form a ZnS shell with a thickness of two monolayers. Ten minutes after the ZnS precursor solution was added dropwise, the heater was removed to stop the reaction. The reaction mixture was then cooled to room temperature. The resulting white precipitate was removed by centrifugation to prepare a clear nanocrystalline particle dispersion liquid (an ODE dispersion liquid of InP/ZnSeS/ZnS nanocrystalline particles) in which red-light-emitting InP/ZnSeS/ZnS nanocrystalline particles were dispersed.

[Synthesis of Organic Ligand for InP/ZnSeS/ZnS Nanocrystal Particles]

(Synthesis of Organic Ligand)

After poly(ethylene glycol) with an average Mn of 400 (manufactured by Sigma-Aldrich) was charged into a flask, the same number of moles of succinic anhydride (manufactured by Sigma-Aldrich) as the poly(ethylene glycol) with an average Mn of 400 was added thereto while stirring in a nitrogen gas environment. The internal temperature of the flask was increased to 80° C. After stirring for 8 hours, a light yellow viscous oily organic ligand represented by the following formula (A) was prepared.

[Chem. 13]

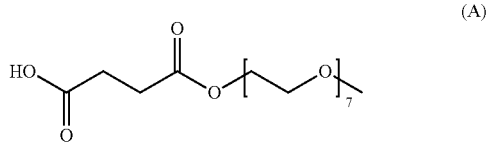

(A)

[Preparation of Red-Light-Emitting InP/ZnSeS/ZnS Nanocrystal Particle Dispersion by Ligand Exchange]

30 mg of the organic ligand was added to 1 ml of the ODE dispersion liquid of the InP/ZnSeS/ZnS nanocrystalline particles. The ODE dispersion liquid was then heated at 90° C. for 5 hours for ligand exchange. With the progress of the ligand exchange, the nanocrystalline particles agglomerated. After the completion of the ligand exchange, the supernatant was decanted to collect the nanocrystalline particles. 3 ml of ethanol was then added to the nanocrystalline particles, and the nanocrystalline particles were redispersed by ultrasonication. 10 ml of n-hexane was added to 3 mL of the ethanol dispersion liquid of nanocrystalline particles. The nanocrystalline particles were then precipitated by centrifugation. The nanocrystalline particles (InP/ZnSeS/ZnS nanocrystalline particles modified with the organic ligand) were collected by decantation of the supernatant and by drying under vacuum. The organic ligand content of the nanocrystalline particles modified with the organic ligand was 27.7% by mass. The nanocrystalline particles (InP/ZnSeS/ZnS nanocrystalline particles modified with the organic ligand) were dispersed in the photopolymerizable component 1 such that the nanocrystalline particle content of the dispersion was 40.0% by mass. Thus, a red-light-emitting nanocrystalline particle dispersion 1 was prepared.

Red-light-emitting nanocrystalline particle dispersions 2 to 7 were prepared in the same manner as described above except that the photopolymerizable components 2 to 7 were used instead of the photopolymerizable component 1.

<Preparation of Light-Scattering Particle Dispersion>

33.0 g of titanium oxide (trade name: CR-60-2, manufactured by Ishihara Sangyo Kaisha, Ltd., average particle size (volume-average size): 210 nm), 1.0 g of a polymer dispersant (trade name: Ajisper PB-821, manufactured by Ajinomoto Fine-Techno Co., Inc.), and 26.0 g of the photopolymerizable component 1 were mixed in a vessel filled with argon gas. Zirconia beads (diameter: 1.25 mm) were added to the mixture and were shaken in a paint conditioner for 2 hours to disperse the mixture. The zirconia beads were removed using a polyester mesh filter to prepare a light-scattering particle dispersion 1 (titanium oxide content: 55% by mass).

Light-scattering particle dispersions 2 to 7 were prepared in the same manner as described above except that the photopolymerizable components 2 to 7 were used instead of the photopolymerizable component 1.

Example 1

[Preparation of Red Ink Composition (Ink Jet Ink)]

The red-light-emitting nanocrystalline particle dispersion 1, the light-scattering particle dispersion 1, a photopolymerization initiator Omnirad TPO-H (2,4,6-trimethylbenzoyl-diphenyl-phosphine oxide, manufactured by IGM resin, trade name, molecular weight: 316), and a phosphite compound JP-333E were uniformly mixed in a vessel filled with argon gas. The component contents of the ink composition were shown in Table 2. The mixture was then passed through a filter with a pore size of 5 μm in a glove box. Argon gas was introduced into a vessel containing the filtrate to saturate the vessel with argon gas. Thus, an ink composition of Example 1 was prepared. The light-emitting nanocrystalline particle content in Table 2 includes the organic ligand content.

Example 2 to 15 and Comparative Example 1

Ink compositions of Examples 2 to 15 and Comparative Example 1 were prepared in the same manner as in Example 1 except that phosphite compounds shown in Tables 2 to 4 were used as the phosphite triester compounds and that the red-light-emitting nanocrystalline particle dispersion 1, the light-scattering particle dispersion 1, the photopolymerization initiator, and the phosphite compound were mixed such that the component contents of the ink composition were shown in Tables 2 to 4.

Example 16

An ink composition of Example 16 was prepared in the same manner as in Example 8 except that the red-light-emitting nanocrystalline particle dispersion 2 and the light-scattering particle dispersion 2 were used instead of the red-light-emitting nanocrystalline particle dispersion 1 and the light-scattering particle dispersion 1.

Example 17

An ink composition of Example 17 was prepared in the same manner as in Example 8 except that the red-light-emitting nanocrystalline particle dispersion 3 and the light-scattering particle dispersion 3 were used instead of the red-light-emitting nanocrystalline particle dispersion 1 and the light-scattering particle dispersion 1.

Example 18

An ink composition of Example 18 was prepared in the same manner as in Example 8 except that the red-light-emitting nanocrystalline particle dispersion 4 and the light-scattering particle dispersion 4 were used instead of the red-light-emitting nanocrystalline particle dispersion 1 and the light-scattering particle dispersion 1.

Example 19

An ink composition of Example 19 was prepared in the same manner as in Example 8 except that the red-light-emitting nanocrystalline particle dispersion 5 and the light-scattering particle dispersion 5 were used instead of the red-light-emitting nanocrystalline particle dispersion 1 and the light-scattering particle dispersion 1.

Example 20

An ink composition of Example 20 was prepared in the same manner as in Example 8 except that the red-light-emitting nanocrystalline particle dispersion 6 and the light-scattering particle dispersion 6 were used instead of the red-light-emitting nanocrystalline particle dispersion 1 and the light-scattering particle dispersion 1.

Example 21

An ink composition of Example 21 was prepared in the same manner as in Example 8 except that the red-lightemitting nanocrystalline particle dispersion 7 and the light-scattering particle dispersion 7 were used instead of the red-light-emitting nanocrystalline particle dispersion 1 and the light-scattering particle dispersion 1.

<Evaluation>
[Preparation of Sample for Evaluation]

Each ink composition was applied to a glass substrate with a spin coater in the air such that the film thickness was 10 μm. The coating film was cured in a nitrogen atmosphere by UV radiation with a UV-LED irradiation apparatus (wavelength: 395 nm) manufactured by CCS Inc. such that the integrated amount of light was 1500 mJ/cm$^2$, thereby forming a layer (light conversion layer) of a cured product of the ink composition on the glass substrate. Thus, the substrate with the light conversion layer was prepared as a sample for evaluation.

[Evaluation of External Quantum Efficiency (EQE)]

A blue LED (peak emission wavelength: 450 nm) manufactured by CCS Inc. was used as a surface-emitting light source. An array spectrometer (trade name "MCPD-9800") manufactured by Otsuka Electronics Co., Ltd. coupled to an integrating sphere was used as a measuring apparatus. The integrating sphere was installed over the blue LED. The sample for evaluation was placed between the blue LED and the integrating sphere. After the blue LED was turned on, a spectrum and an illuminance at each wavelength were measured.

The external quantum efficiency was determined from the spectrum and illuminance measured with the measuring apparatus, as described below. The external quantum efficiency is indicative of the fraction of light (photons) incident on the light conversion layer and radiated as fluorescence toward the observer. Thus, a larger value is indicative of better light-emitting properties of the light conversion layer, and the value is an important evaluation index.

EQE (%)=P1(Red)/E(Blue)×100

In the formula, E (Blue) and P1 (Red) denote the following.

E (Blue): The total value of "illuminance×wavelength/hc" in the wavelength range of 380 to 490 nm.

P1 (Red): The total value of "illuminance×wavelength/hc" in the wavelength range of 590 to 780 nm.

These values correspond to the numbers of photons observed. h denotes the Planck constant, and c denotes the speed of light.

The effect of improving external quantum efficiency in the red ink compositions of the examples and the comparative example was rated according to the following criteria. Tables 2 to 5 show the results.

A: more than 35%
B: more than 30% and 35% or less
C: more than 25% and 30% or less
D: 25% or less

TABLE 2

| | | Example 1 | Example 2 | Example 3 | Example 4 | Comparative example 1 |
|---|---|---|---|---|---|---|
| Photopolymerizable component | 1 (HDDA) | 59 | 59 | 59 | 59 | 59 |
| Phosphite compound | JP-333E | 3 | — | — | — | — |
| | JPS-312 | — | 3 | — | — | — |
| | JPM-308 | — | — | 3 | — | — |
| | JPE-10 | — | — | — | 3 | — |
| | Irgafos 168 | — | — | — | — | 3 |
| Light-emitting nanocrystalline particles | | 25 | 25 | 25 | 25 | 25 |
| Light-scattering particles | | 10 | 10 | 10 | 10 | 10 |
| Photopolymerization initiator | | 3 | 3 | 3 | 3 | 3 |
| EQE | | C | C | C | B | D |

TABLE 3

| | | Example 5 | Example 6 | Example 7 | Example 8 | Example 9 | Example 10 |
|---|---|---|---|---|---|---|---|
| Photopolymerizable component | 1 (HDDA) | 54 | 59 | 54 | 59 | 58 | 54 |
| Phosphite compound | JP-333E | — | — | — | — | — | — |
| | JPS-312 | — | — | — | — | — | — |
| | JPM-308 | — | — | — | — | — | — |
| | JPE-10 | 3 | 3 | 3 | 0.5 | 0.5 | 0.5 |
| | Irgafos 168 | — | — | — | — | — | — |
| Light-emitting nanocrystalline particles | | 30 | 30 | 35 | 35 | 35 | 40 |
| Light-scattering particles | | 10 | 5 | 5 | 2.5 | 3.5 | 2.5 |
| Photopolymerization initiator | | 3 | 3 | 3 | 3 | 3 | 3 |
| EQE | | B | B | A | A | A | A |

TABLE 4

| | | Example 11 | Example 12 | Example 13 | Example 14 | Example 15 |
|---|---|---|---|---|---|---|
| Photopolymerizable component | 1 (HDDA) | 59 | 59 | 59 | 60.5 | 61.95 |
| Phosphite compound | JP-333E | 0.5 | — | — | — | — |
| | JPS-312 | — | 0.5 | — | — | — |
| | JPM-308 | — | — | 0.5 | — | — |
| | JPE-10 | — | — | — | 0.5 | 0.5 |
| | Irgafos 168 | — | — | — | — | — |
| Light-emitting nanocrystalline particles | | 35 | 35 | 35 | 35 | 35 |
| Light-scattering particles | | 2.5 | 2.5 | 2.5 | 2.5 | 2.5 |
| Photopolymerization initiator | | 3 | 3 | 3 | 1.5 | 0.05 |
| EQE | | B | B | B | A | A |

TABLE 5

| | | Example 16 | Example 17 | Example 18 | Example 19 | Example 20 | Example 21 |
|---|---|---|---|---|---|---|---|
| Photo-polymerizable component | 1 (HDDA) | — | — | — | — | — | — |
| | 2 (BDDAc) | 59 | — | — | — | — | — |
| | 3 (PHE) | — | 59 | — | — | — | — |
| | 4 (EOEA) | — | — | 59 | — | — | — |
| | 5 (DPGDA) | — | — | — | 59 | — | — |
| | 6 (HDDMA) | — | — | — | — | 59 | — |
| | 7 (NDA/BDDAc) | — | — | — | — | — | 59 |
| Phosphite compound | JPE-10 | 0.5 | 0.5 | 0.5 | 0.5 | 0.5 | 0.5 |
| Light-emitting nanocrystalline particles | | 35 | 35 | 35 | 35 | 35 | 35 |
| Light-scattering particles | | 2.5 | 2.5 | 2.5 | 2.5 | 2.5 | 2.5 |
| Photopolymerization initiator | | 3 | 3 | 3 | 3 | 3 | 3 |
| EQE | | A | A | A | A | A | A |

REFERENCE SIGNS LIST

10 pixel unit, 10a first pixel unit, 10b second pixel unit, 10c third pixel unit, 11a first light-emitting nanocrystalline particle, 11b second light-emitting nanocrystalline particle, 12a first light-scattering particle, 12b second light-scattering particle, 12c third light-scattering particle, 20 light-shielding portion, 30 light conversion layer, 40 substrate, 100 color filter.

The invention claimed is:

1. An ink composition comprising:
   light-emitting nanocrystalline particles;
   a photopolymerizable component containing at least one photopolymerizable compound and having a Hansen solubility parameter δp of 3.0 MPa$^{0.5}$ or more; and
   a phosphite compound with a partial structure represented by the following formula (1):

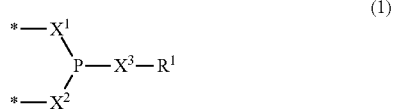

(1)

wherein X$^1$ to X$^3$ independently denote an oxygen atom or a sulfur atom, R$^1$ denotes an alkyl group, and * denotes a bonding arm,
   wherein the phosphite compound is a compound represented by the following formula (6);

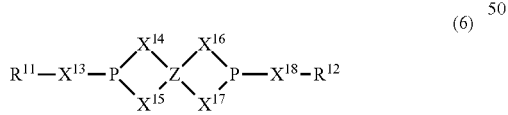

(6)

wherein X$^{13}$ to X$^{18}$ independently denote an oxygen atom or a sulfur atom, Z denotes a tetravalent hydrocarbon group, R$^{11}$ and R$^{12}$ independently denote a monovalent hydrocarbon group, and at least one of R$^{11}$ and R$^{12}$ denotes an alkyl group.

2. The ink composition according to claim 1, wherein the alkyl group in the formula (1) has 1 to 13 carbon atoms.

3. The ink composition according to claim 1, wherein the phosphite compound is liquid at 25° C. and at 1 atm.

4. The ink composition according to claim 1, wherein the phosphite compound has two partial structures represented by the formula (1).

5. A light conversion layer formed from the ink composition according to claim 1.

6. An ink jet system comprising the ink composition according to claim 1.

7. A light conversion layer comprising:
   a plurality of pixel units; and a light-shielding portion between the plurality of pixel units,
   wherein the plurality of pixel units have a light-emitting pixel unit containing a cured product of the ink composition according to claim 1.

8. The light conversion layer according to claim 7, comprising:
   as the light-emitting pixel unit,
   a first light-emitting pixel unit containing light-emitting nanocrystalline particles that absorb light in a wavelength range of 420 to 480 nm and emit light in an emission peak wavelength range of 605 to 665 nm; and
   a second light-emitting pixel unit containing light-emitting nanocrystalline particles that absorb light in a wavelength range of 420 to 480 nm and emit light in an emission peak wavelength range of 500 to 560 nm.

9. A light conversion layer comprising:
   a plurality of pixel units; and a light-shielding portion between the plurality of pixel units; and
   a non-luminous pixel unit containing light-scattering particles;
   wherein the plurality of pixel units have a light-emitting pixel unit containing a cured product of an ink composition comprising:
   light-emitting nanocrystalline particles;
   a photopolymerizable component containing at least one photopolymerizable compound and having a Hansen solubility parameter δp of 3.0 MPa$^{0.5}$ or more; and
   a phosphite compound with a partial structure represented by the following formula (1);

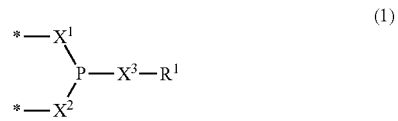

(1)

wherein X$^1$ to X$^3$ independently denote an oxygen atom or a sulfur atom R$^1$ denotes an alkyl group, and * denotes a bonding arm.

10. A color filter comprising the light conversion layer according to claim 7.

* * * * *